US012205454B2

(12) United States Patent
Bergkvist et al.

(10) Patent No.: US 12,205,454 B2
(45) Date of Patent: Jan. 21, 2025

(54) ELECTRONIC DEVICE AND RELATED METHODS FOR FIRE DETECTION

(71) Applicant: Sony Group Corporation, Tokyo (JP)

(72) Inventors: Hannes Bergkvist, Rydeback (SE); Peter Exner, Malmö (SE)

(73) Assignee: Sony Group Corporation, Tokyo (JP)

(*) Notice: Subject to any disclaimer, the term of this patent is extended or adjusted under 35 U.S.C. 154(b) by 172 days.

(21) Appl. No.: 17/878,818

(22) Filed: Aug. 1, 2022

(65) Prior Publication Data

US 2023/0065639 A1 Mar. 2, 2023

(30) Foreign Application Priority Data

Aug. 26, 2021 (SE) .................................... 2151022-7

(51) Int. Cl.
*G08B 25/00* (2006.01)
*G08B 17/06* (2006.01)

(52) U.S. Cl.
CPC ........... *G08B 25/001* (2013.01); *G08B 17/06* (2013.01)

(58) Field of Classification Search
CPC ...... G08B 25/001; G08B 17/06; G08B 29/26; A62C 37/10
See application file for complete search history.

(56) References Cited

U.S. PATENT DOCUMENTS

| | | | | |
|---|---|---|---|---|
| 7,880,604 | B2 | 2/2011 | McKenna et al. | |
| 11,839,783 | B1 * | 12/2023 | Schroeder | A62C 35/13 |
| 2015/0221321 | A1 * | 8/2015 | Christian | G10L 25/48 700/94 |
| 2019/0228641 | A1 | 7/2019 | Lehning | |
| 2020/0161070 | A1 | 5/2020 | Seo | |
| 2022/0114872 | A1 * | 4/2022 | Rutter | G08B 25/001 |

FOREIGN PATENT DOCUMENTS

| | | | | |
|---|---|---|---|---|
| CN | 105844836 | A | 8/2016 | |
| CN | 109011258 | A * | 12/2018 | A62C 3/06 |
| CN | 111508182 | A | 8/2020 | |
| EA | 025420 | B1 | 12/2016 | |
| EP | 2567575 | A2 | 3/2013 | |
| GB | 2512028 | A | 9/2014 | |
| JP | 2005038401 | A | 2/2005 | |
| KR | 101972701 | B1 | 4/2019 | |
| KR | 20190120015 | A | 10/2019 | |
| WO | 2010015742 | A1 | 2/2010 | |

OTHER PUBLICATIONS

Office Action and Swedish Search Report from corresponding Swedish Application No. 2151022-7, mailed on Mar. 29, 2022, 9 pages.

* cited by examiner

*Primary Examiner* — Andrew W Bee
(74) *Attorney, Agent, or Firm* — Tucker Ellis LLP

(57) ABSTRACT

An electronic device, having a primary function different from detecting a fire, is configured for detecting a fire. The device includes processor circuitry, and a temperature sensor configured to generate temperature data, wherein the processor circuitry is configured to determine whether a first generated temperature data meets a first temperature criteria at a first time, and determine whether a second generated temperature data meets a second temperature criteria at a second time after the first time.

14 Claims, 9 Drawing Sheets

ELECTRONIC DEVICE AND RELATED METHODS FOR FIRE DETECTION

RELATED APPLICATION DATA

The present application claims priority to Swedish Patent Application No. 2151022-7, filed Aug. 16, 2021, the content of which is incorporated herein by reference in its entirety.

TECHNICAL FIELD

The present disclosure pertains generally to the field of fire detection, such as the determination and dissemination of warnings regarding a potential fire hazard between different electronic devices. The present disclosure relates to electronic devices and related methods.

BACKGROUND

Natural disasters and extreme weather conditions have been identified as significant ongoing challenges. In many areas, such as but not limited to California and Australia, wildfires are among the most common natural disaster. Wildfires can spread fast from rural to urban areas and in many cases continue to propagate from one property to another. The characteristic of a wildfire, having a speed and direction of spread that is hard to predict, creates a hazardous situation, difficult to evacuate and with a high risk of getting caught in a burning home or neighborhood. Further, accidental fires in buildings, such as homes, can present similar challenges.

To mitigate the risk, residential communities rely on fire alarms and information and instructions from fire and rescue services. However, most fire alarms only cover a limited part of the home and are not connected as a system covering an entire neighborhood. Also, in scenarios with fast spreading wildfires, fire rescue services can have a hard time monitoring the situation, leading to difficulty in providing information and deploying resources where they are needed to create a dynamic evacuation plan.

SUMMARY

Accordingly, there is a need for electronic devices and methods which can effectively determine and communicate potential fire hazards to one or more other electronic devices.

There is a need for devices and related methods which may mitigate, alleviate, or address the existing shortcomings, for example by effectively communicating potential fire hazards between devices.

Disclosed herein is an electronic device. The electronic device is configured for detecting a fire. The electronic device comprises memory circuitry. The electronic device comprises interface circuitry. The electronic device comprises processor circuitry. The electronic device comprises a temperature sensor. The temperature sensor is configured to generate temperature data. The processor circuitry is configured to determine whether a first generated temperature data meets a first temperature criteria at a first time. The processor circuitry is configured to, in accordance with the determination that the first generated temperature data meets the first temperature criteria at the first time, transmit an alarm signal. The processor circuitry is configured to, in accordance with the determination that the first generated temperature data meets the first temperature criteria at the first time, transmit, to one or more second electronic device(s), an alarm signal. The processor circuitry is configured to, in accordance with the determination that the first generated temperature data meets the first temperature criteria at the first time, determine whether a second generated temperature data meets a second temperature criteria at a second time after the first time. The processor circuitry is configured to in accordance with the determination that the second generated temperature data meets the second temperature criteria at the second time, transmit an all-clear signal. The processor circuitry is configured to in accordance with the determination that the second generated temperature data meets the second temperature criteria at the second time, transmit, to the one or more second electronic device(s), an all-clear signal. The electronic device is configured to have a primary function different from the detecting a fire.

Also disclosed herein is a method. The method is performed by an electronic device having a primary function different than detecting a fire. The method comprises generating temperature data. The method comprises determining whether a first generated temperature data meets a first temperature criteria at a first time. In accordance with the determination that the first generated temperature data meets the first temperature criteria at the first time, the method comprises transmitting an alarm signal. In accordance with the determination that the first generated temperature data meets the first temperature criteria at the first time, the method comprises transmitting, to one or more second electronic device(s), an alarm signal. In accordance with the determination that the first generated temperature data meets the first temperature criteria at the first time, the method comprises determining whether a second generated temperature data meets a second temperature criteria at a second time after the first time. In accordance with the determination that the second generated temperature data meets the second temperature criteria at the second time, the method comprises transmitting an all-clear signal. In accordance with the determination that the second generated temperature data meets the second temperature criteria at the second time, the method comprises transmitting, to the one or more second electronic device(s), an all-clear signal.

It is an advantage of the present disclosure that a plurality of electronic devices can work together to monitor, detect, and/or analyze capabilities of a fire hazard, such as spread, direction, and speed. For example, electronic devices within a home or between a plurality of homes can communicate together for determination of an appropriate evacuation guidance. Further, it is an advantage of the present disclosure that consumer devices currently equipped with connectivity and internal temperature-sensors can be used for fire hazard detection.

This may lead to improved safety for users when dealing with a fire hazard, while also having backup confirmation of fire hazards for the reduction of false alarms. Further, the disclosure may improve fire-fighting capabilities of fire hazards by determining and providing information on a fire-hazard.

Disclosed herein is a mobile communication device. The mobile communication device comprises memory circuitry. The mobile communication device comprises interface circuitry. The interface circuitry is configured to receive an alarm signal. The interface circuitry can be configured to receive an alarm signal from an electronic device. The interface circuitry is configured to receive an all-clear signal. The interface circuitry can be configured to receive an all-clear signal from an electronic device. The alarm signal can comprise electronic location data. The electronic location data can be indicative of a location of the electronic device. The mobile communication device comprises processor circuitry. The mobile communication device comprises display circuitry. The processor circuitry is configured to in accordance with the mobile communication device receiving the alarm signal, wait for an alarm time. The processor circuitry is configured to in accordance with the mobile communication device not receiving the all-clear signal within the alarm time, generate a fire confirmation signal. The fire confirmation signal is indicative of a fire. The processor circuitry is configured to in accordance with the mobile communication device not receiving the all-clear signal within the alarm time, display an alarm display indicative of the fire confirmation signal. The processor circuitry is configured to in accordance with the mobile communication device not receiving the all-clear signal within the alarm time, display, via the display circuitry, an alarm display indicative of the fire confirmation signal.

Further disclosed herein is a method. The method is performed by a mobile communication device. The method comprises receiving an alarm signal from an electronic device. The alarm signal can comprise electronic location data indicative of a location of the electronic device. In accordance with receiving the alarm signal, the method comprises waiting for an alarm time for receiving an all-clear signal. In accordance with not receiving the all-clear signal within the alarm time, the method comprises generating a fire confirmation signal indicative of a fire. In accordance with not receiving the all-clear signal within the alarm time, the method comprises displaying, via the display circuitry, an alarm display indicative of the fire confirmation signal. In accordance with not receiving the all-clear signal within the alarm time, the method comprises generating a fire confirmation signal indicative of a fire and displaying, via the display circuitry, an alarm display indicative of the fire confirmation signal.

It is an advantage of the present disclosure that a mobile communication device can receive information from other connected electronic devices regarding the capabilities of a fire hazard, such as spread, direction, and speed. For example, a mobile communication device can receive information from one or more connected devices regarding a fire hazard and provide appropriate evacuation guidance to a user.

This may lead to improved safety for users when dealing with a fire hazard by combining fire hazard information from one or more sources, which may provide a more robust understanding of the fire hazard.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
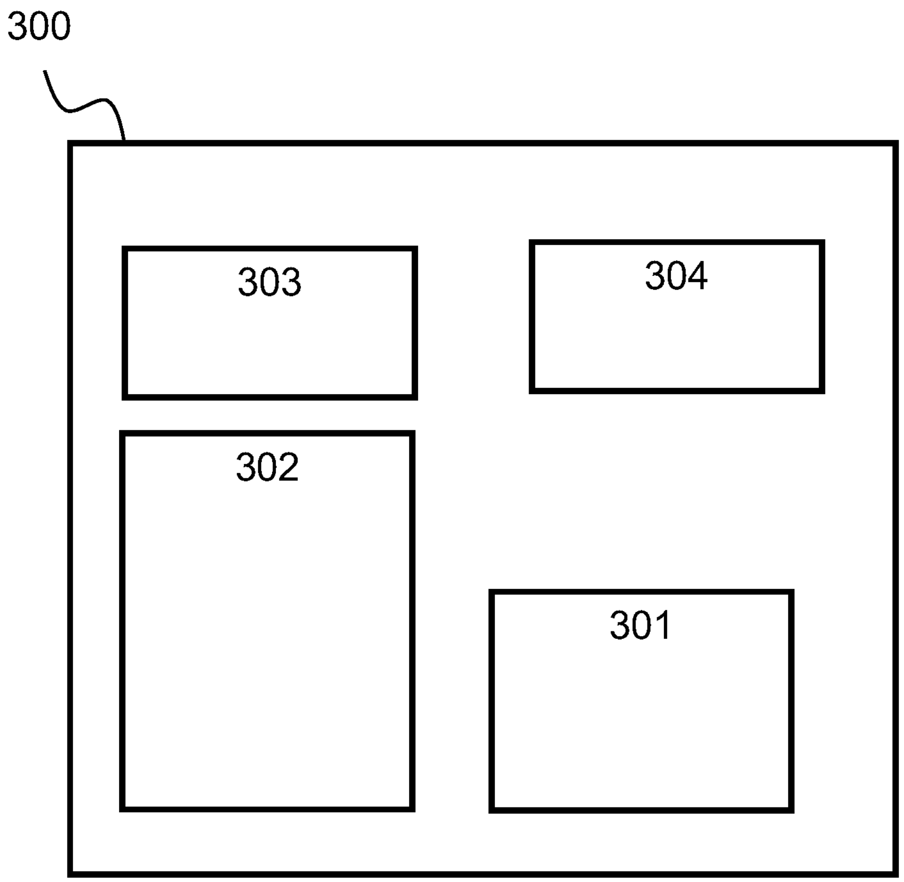
FIG. 1 is a block diagram illustrating an example electronic device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are devices, systems, assemblies, and/or methods for detecting fire hazards and transmitting, or communicating, information about said fire hazards. Fire hazards can include, for example, one or more of: fires, wildfires, home fires, structural fires, building fires, kitchen fires, and natural fires. Fire hazards and fire can be used interchangeably herein. The particular type of fire is not limiting. Advantageously, the disclosed devices and methods can detect and transmit information about fire hazards even upon destruction of an electronic device, such as by the fire hazard. Electronic devices can include consumer electronic devices, such as Internet-of-Things (IoT) electronic devices. Electronic devices discussed herein can be configured to communicate, such as receive and/or transmit data, with other electronic devices.

Advantageously, the disclosure can utilize consumer electronic devices, which are generally ubiquitous, as a detector and/or alarm for a fire hazard. Other non-consumer products can be used as well. For example, multiple electronic devices within a space can detect and then communicate, or collaborate, for one or more of: fire hazard detection coverage, monitoring, and evacuation guidance. Multiple electronic in an area, such as a neighbourhood, can detect and then communicate for one or more of: remote fire detection, monitoring, and outdoor evacuation guidance. The space or area discussed can be, for example, a house, neighbourhood, apartment, apartment complex, building, area, enclosed area, farm, or factory.

Electronic devices, such as consumer electronic devices, can have connectivity, such as the ability to transmit and/or receive from another device, such as communicating with another device. The electronic devices can further include a type of temperature sensor. For example, a temperature sensor commonly found in most processing chips to measure central processing unit (CPU) temperature. The temperature sensor can also allow the electronic device handle activity accordingly. The disclosure can leverage this kind of sensor to detect fire hazards by correlating the temperature with the processing load of the chip and reacting to extreme outliers.

Additionally, disclosed herein is one or more methods for using a system of electronic devices for evacuation guidance and detecting and monitoring the spread of fire hazards, such as accidental or wildfires. Example devices include smart-TV, computers, tablets, gaming console, mobile phones etc.

As discussed in detail below, electronic devices and methods disclosed herein can utilize a model of device operating temperatures. The model can be configured to predict first temperature criteria and/or second temperature criteria, such as based on operating temperatures and/or operating times of an electronic device. Based on operating temperatures and/or operating times, the model can be configured to be set and/or trained and/or updated to learn from the operating temperatures and/or operating times, thereby improving reliability of the electronic device.

Training as discussed herein can include one or more of: updating, adding data, machine learning, artificial intelligence learning, adding labeling data, adding annotating data, and modifying, such as for the model. Training can include updating the model. Training can include adding data, such as to the model. Training can include machine learning, such as by the model. Training can include artificial intelligence learning, such as by the model. Training can include modifying data, such as in the model. Training can include adding labeling data and/or meeting data, such as in the model.

The electronic device can be part of a system and/or assembly of devices. The electronic device can be one or more electronic devices. The electronic device can be configured to connect to one or more other electronic devices. The electronic device can be configured to connect to a server. The electronic device can be configured to connect to a user equipment. The electronic device can be configured to connect to a second device, such as a second electronic device and/or a mobile communication device, via wired and/or wireless connections. The connections can be wired and/or wireless connections. The electronic device can be an Internet-of-Things (IoT) device. The electronic device can be a consumer device.

The figures are schematic and simplified for clarity, and they merely show details which aid understanding the disclosure, while other details have been left out. Throughout, the same reference numerals are used for identical or corresponding parts.

FIG. 1 shows a block diagram of an example electronic device 300 according to the disclosure.

The electronic device 300 comprises memory circuitry 301. The electronic device 300 comprises processor circuitry 302. The electronic device 300 comprises interface circuitry 303, for example for wired and/or wireless communications. The electronic device 300 comprises a temperature sensor 304. The electronic device 300 can include any or all features of the mobile communication device 400 disclosed above.

In one or more example electronic devices, the electronic device 300 comprises memory circuitry 301. In one or more example electronic devices, the electronic device 300 comprises interface circuitry 303. In one or more example electronic device, the electronic device 300 comprises processor circuitry 302. In one or more example electronic devices, the electronic device 300 comprises a temperature sensor 304. The temperature sensor 304 is configured to generate temperature data. The processor circuitry 302 is configured to determine whether a first generated temperature data meets a first temperature criteria at a first time. In accordance with the determination that the first generated temperature data meets the first temperature criteria at the fire time, the processor circuitry 302 is configured to transmit an alarm signal. For example, in accordance with the determination that the first generated temperature data meets the first temperature criteria at the fire time, the processor circuitry 302 is configured to transmit, to one or more second electronic device(s), an alarm signal. In accordance with the determination that the first generated temperature data meets the first temperature criteria at the fire time, the processor circuitry 302 is configured to determine whether a second generated temperature data meets a second temperature criteria at a second time after the first time. In accordance with the determination that the second generated temperature data meets the second temperature criteria at the second time, the processor circuitry 302 is configured to transmit an all-clear signal. For example, in accordance with the determination that the second generated temperature data meets the second temperature criteria at the second time, the processor circuitry 302 is configured to transmit, to the one or more second electronic device(s), an all-clear signal. The electronic device 300 is configured to have a primary function different from detecting a fire.

The temperature sensor 304 may be configured to generate temperature data indicative of a temperature inside the electronic device 300. The temperature sensor 304 may be configured to generate temperature data indicative of a temperature outside the electronic device 300. The temperature sensor 304 may be configured to generate temperature data indicative of both outside and inside the electronic device 300.

The temperature sensor 304 may be configured to continuously generate temperature data. The temperature sensor 304 may be configured to generate temperature data at intervals. For example, the temperature sensor 304 may be configured to generate temperature data at a first time, a second time, a third time, a fourth time, etc. The generated temperature data may be associated, or indicative of, a particular time such as a first generated temperature data associated with a first time, a second generated temperature data associated with a second time, a third generated temperature data associated with a third time, etc. The generated temperature data may be for a single time. The generated temperature data may be for a period, such as a duration, of time.

In one or more example electronic devices, the first time and/or the second time may be a particular instance, e.g., instant, of time. In one or more example electronic devices, the first time and/or the second time may be a period, such as a duration, of time.

As mentioned, the processor circuitry 302 can be configured to determine whether a first generated temperature data meets a first temperature criteria a first time.

The first temperature criteria may be a first temperature range. In one or more example electronic devices, in accordance with the first temperature data being within the first temperature range, the processor circuitry 302 can be configured to determine that the first temperature range meets the first temperature criteria. In one or more example electronic devices, in accordance with the first temperature data not being within the first temperature range, the processor circuitry 302 can be configured to determine that the first temperature range does not meet the first temperature criteria. For example, the first temperature range could include temperatures of 10 degrees C. warmer than the standard operating temperature of the electronic device 300 through a combustion temperature of the electronic device 300.

In one or more example electronic devices, in one or more example electronic devices, in accordance with the first temperature data being above the first temperature range, the processor circuitry 302 can be configured to determine that the first temperature range meets the first temperature criteria. In one or more example electronic devices, in one or more example electronic devices, in accordance with the first temperature data being not above the first temperature range, the processor circuitry 302 can be configured to determine that the first temperature range does not meet the first temperature criteria. For example, the first temperature range can be the normal operating temperature range of the electronic device 300, plus or minus 10 degrees C.

As the electronic device 300 can have a primary function different from the detecting a fire, the normal operating temperature may vary depending on the particular electronic device 300 functionality. The electronic device 300 may have a first normal operating temperature, a second normal operating temperature, and/or a third normal operating temperature. For example, the normal operating temperature may vary depending on one or more operating parameters of the electronic device. The one or more operating parameters can be indicative of functions being performed. As an example, a television may have a first normal operating temperature when an operating parameter is indicative of the television being turned off and a second normal operating when an operating parameter is indicative of the television turned on.

In one or more example electronic devices, in accordance with the first temperature data being below the first temperature range, the processor circuitry 302 can be configured to determine that the first temperature range does not meet the first temperature criteria. In one or more example electronic devices, in accordance with the first temperature data being not below the first temperature range, the processor circuitry 302 can be configured to determine that the first temperature range meets the first temperature criteria. For example, the first temperature range could include temperatures of 10 degrees C. warmer than the standard operating temperature of the electronic device 300 through a combustion temperature of the electronic device 300.

In one or more example electronic devices, in accordance with the first temperature data being equal to or below the first temperature range, the processor circuitry 302 can be configured to determine that the first temperature range does not meet the first temperature criteria. In one or more example electronic devices, in accordance with the first temperature data being not equal to or below the first temperature range, the processor circuitry 302 can be configured to determine that the first temperature range meets the first temperature criteria. For example, the first temperature range could include temperatures of 10 degrees C. warmer than the standard operating temperature of the electronic device 300 through a combustion temperature of the electronic device 300.

In one or more example electronic devices, in accordance with the first temperature data being within the first temperature range, the processor circuitry 302 can be configured to determine that the first temperature range does not meet the first temperature criteria. In one or more example electronic devices, in accordance with the first temperature data being not within the first temperature range, the processor circuitry 302 can be configured to determine that the first temperature range meets the first temperature criteria. For example, the first temperature range can be the normal operating temperature range of the electronic device 300, plus or minus 10 degrees C.

The first temperature criteria may be a first rate of change of the generated temperature data. In one or more example electronic devices, in accordance with the first temperature data being above the first rate of change, the processor circuitry 302 can be configured to determine that the first temperature range meets the first temperature criteria. In one or more example electronic devices, in accordance with the first temperature data being not above the first rate of change, the processor circuitry 302 can be configured to determine that the first temperature range does not meet the first temperature criteria. For example, the first rate of change may be 1 degree C. per second.

In one or more example electronic devices, in accordance with the first temperature data being below the first rate of change, the processor circuitry 302 can be configured to determine that the first temperature range does not meet the first temperature criteria. In one or more example electronic devices, in accordance with the first temperature data being not below the first rate of change, the processor circuitry 302 can be configured to determine that the first temperature range meets the first temperature criteria. For example, the first rate of change may be 1 degree C. per second.

In one or more example electronic devices, in accordance with the first temperature data being equal to the first rate of change, the processor circuitry 302 can be configured to determine that the first temperature range does not meet the first temperature criteria. For example, the first rate of change may be 1 degree C. per second.

In one or more example electronic devices, in accordance with the first temperature data being equal to or below the first rate of change, the processor circuitry 302 can be configured to determine that the first temperature range does not meet the first temperature criteria. In one or more example electronic devices, in accordance with the first temperature data being not equal to or below the first rate of change, the processor circuitry 302 can be configured to determine that the first temperature range meets the first temperature criteria. For example, the first rate of change may be 1 degree C. per second.

In one or more example electronic devices, in accordance with the first temperature data being equal to the first rate of change, the processor circuitry 302 can be configured to determine that the first temperature range meets the first temperature criteria. For example, the first rate of change may be 1 degree C. per second.

In one or more example electronic devices, in accordance with the first temperature data being equal to or above the first rate of change, the processor circuitry 302 can be configured to determine that the first temperature range meets the first temperature criteria. In one or more example electronic devices, in accordance with the first temperature data being not equal to or above the first rate of change, the processor circuitry 302 can be configured to determine that the first temperature range does not meet the first temperature criteria. For example, the first rate of change may be 1 degree C. per second.

The first temperature criteria may be a first temperature threshold. In one or more example electronic devices, in accordance with the first temperature data being above the first temperature threshold, the processor circuitry 302 can be configured to determine that the first temperature range meets the first temperature criteria. In one or more example electronic devices, in accordance with the first temperature data being not above the first temperature threshold, the processor circuitry 302 can be configured to determine that the first temperature range does not meet the first temperature criteria. For example, the first temperature threshold can be the operating temperature of the electronic device 300 plus 10 degrees C.

In one or more example electronic devices, in accordance with the first temperature data being below the first temperature threshold, the processor circuitry 302 can be configured to determine that the first temperature range does not meet the first temperature criteria. In one or more example electronic devices, in accordance with the first temperature data being not below the first temperature threshold, the processor circuitry 302 can be configured to determine that the first temperature range meets the first temperature criteria. For example, the first temperature threshold can be the operating temperature of the electronic device 300 plus 10 degrees C.

In one or more example electronic devices, in accordance with the first temperature data being equal to the first temperature threshold, the processor circuitry 302 can be configured to determine that the first temperature range does not meet the first temperature criteria. For example, the first temperature threshold can be the operating temperature of the electronic device 300 plus 10 degrees C.

In one or more example electronic devices, in accordance with the first temperature data being equal to the first temperature threshold, the processor circuitry 302 can be configured to determine that the first temperature range meets the first temperature criteria. For example, the first temperature threshold can be the operating temperature of the electronic device 300 plus 10 degrees C.

In one or more example electronic devices, in accordance with the first temperature data being equal to or above the first temperature threshold, the processor circuitry 302 can be configured to determine that the first temperature range meets the first temperature criteria. In one or more example electronic devices, in accordance with the first temperature data being not equal to or above the first temperature threshold, the processor circuitry 302 can be configured to determine that the first temperature range does not meet the first temperature criteria. For example, the first temperature threshold can be the operating temperature of the electronic device 300 plus 10 degrees C.

For example, the processor circuitry 302 can be configured to determine whether the first generated temperature data meets the first temperature criteria at the first time, which can comprise that the processor circuitry can be configured to determine whether the first generated temperature data is equal to or above a first temperature threshold at the first time.

In accordance with the determination that the first generated temperature data does not meet the first temperature criteria at the first time, the processor circuitry 302 is configured to not transmit the alarm signal. In accordance with the determination that the first generated temperature data does not meet the first temperature criteria at the first time, the processor circuitry 302 is configured to not determine whether the second generated temperature data meets the second temperature criteria at the second time after the first time. In accordance with the determination that the first generated temperature data does not meet the first temperature criteria at the first time, the electronic device 300 takes no action with respect to the first generated temperature data. The temperature sensor 304 continues to generate temperature data, and the processor circuitry 302 continues to determine whether the generated temperature data meets the first temperature criteria at a particular time.

The processor circuitry 302 can be configured to modify, such as change or adjust, the first temperature criteria and/or the second temperature criteria. For example, the processor circuitry 302 can be configured to modify, such as adjust, the first temperature criteria and/or the second temperature criteria based on a location of the electronic device 300.

For example, if the electronic device 300 was moved from a shaded area into direct sunlight, the processor circuitry 302 can be configured to adjust the first temperature criteria and/or the second temperature criteria to be raised. As another example, if the electronic device 300 was moved from a cooler room, such as a bedroom, to a warmer room, such as a kitchen or bathroom, the processor circuitry 302 can be configured to adjust the first temperature criteria and/or the second temperature criteria to be raised.

In one or more example electronic devices, different electronic devices 300 may have the same first temperature criteria and/or the second temperature criteria. In one or more example electronic devices, different electronic devices 300 may have different first temperature criteria and/or the second temperature criteria. For example, an electronic device 300 having a primary function of a television may have different first temperature criteria and/or second temperature criteria as an electronic device 300 having a primary function acting as a refrigerator.

This may occur, for example, as different electronic devices 300 may have different temperature fluctuations. For example, an electronic device 300 having a primary function of a smart fridge may not fluctuate much in operating temperature, such as CPU temperature, as it is constantly running the same processes. Other electronic devices 300 may vary in usage and therefore operating temperature, such as an electronic device 300 having a primary function of a mobile phone. For example, running certain applications may increase the operating temperature of an electronic device 300 having a primary function of a mobile phone.

In one or more example electronic devices, different electronic devices 300 having the same primary function, such as a television, may have different first temperature criteria and/or second temperature criteria. For example, one model of an electronic device 300 with a primary function of a television may have a different first temperature criteria and/or second temperature criteria as a different model of an electronic device 300 with a primary function of a television.

In one or more example electronic devices, in accordance with the determination that the first generated temperature data meets the first temperature criteria at the first time, the processor circuitry 302 can be configured to generate a first temperature parameter based on the first generated temperature data at the first time. The first temperature parameter can be data. The first temperature parameter can be an indicator. The first temperature parameter can be indicative of the first generated temperature data meeting the first temperature criteria.

In accordance with the determination that the first generated temperature data meets the first temperature criteria at the first time, the processor circuitry 302 is configured to transmit an alarm signal. In one or more example electronic devices, in accordance with the determination that the first generated temperature data meets the first temperature criteria at the first time, the processor circuitry 302 can be configured to generate the alarm signal. In accordance with the determination that the first generated temperature data meets the first temperature criteria at the first time, the processor circuitry 302 is configured to transmit, to one or more second electronic device(s) an alarm signal. The one or more second electronic device(s) can be devices capable of, or configured to, receive the alarm signal from the electronic device 300. The one or more second electronic device(s) can be the same device as the electronic device 300. The one or more second electronic device(s) can be a different device as the electronic device 300.

For example, the processor circuitry 302 can be configured to transmit the alarm signal via the interface circuitry 303. The transmitting, such as sending, providing, communicating, messaging, signaling, can be, for example, wired or wirelessly transmitting. The transmitting can be direct transmitting. For example, between the electronic device 300 and the one or more second electronic device(s). The transmitting can be indirect transmitting, such as via the Internet or an intermediate device. The transmitting can be to a single second electronic device. The transmitting can be to a plurality of second electronic devices.

The one or more secondary devices can be located in the same area as the electronic device 300. For example, the one or more secondary devices can be located in the building, such as an office, home, apartment, as the electronic device 300. The one or more secondary devices can be located a separate building as the electronic device 300. For example, the electronic device 300 can be in a particular home, and the one or more secondary devices can be located in other homes in a neighborhood.

The alarm signal can be data indicative of an alarm. The alarm signal can be data indicative of a potential fire hazard.

As mentioned, the processor circuitry 302 can be configured to determine whether a second generated temperature data meets a second temperature criteria a second time.

The second temperature criteria may be a second temperature range. In one or more example electronic devices, in accordance with the second temperature data being within the second temperature range, the processor circuitry 302 can be configured to determine that the second temperature range meets the second temperature criteria. For example, the second temperature range can be the normal operating temperature range of the electronic device 300, plus or minus 10 degrees C.

In one or more example electronic devices, in accordance with the second temperature data being not within the second temperature range, the processor circuitry 302 can be configured to determine that the second temperature range does not meet the second temperature criteria. For example, the second temperature range can be the normal operating temperature range of the electronic device 300, plus or minus 10 degrees C.

In one or more example electronic devices, in accordance with the second temperature data being below the second temperature range, the processor circuitry 302 can be configured to determine that the second temperature range meets the second temperature criteria. In one or more example electronic devices, in accordance with the second temperature data being not below the second temperature range, the processor circuitry 302 can be configured to determine that the second temperature range does not meet the second temperature criteria. For example, the second temperature range could include temperatures of 10 degrees C. warmer than the standard operating temperature of the electronic device 300 through a combustion temperature of the electronic device 300.

The second temperature criteria may be a second rate of change of the generated temperature data. In one or more example electronic devices, in accordance with the second temperature data being below the second rate of change, the processor circuitry 302 can be configured to determine that the second temperature range meets the second temperature criteria. In one or more example electronic devices, in accordance with the second temperature data being not below the second rate of change, the processor circuitry 302 can be configured to determine that the second temperature range does not meet the second temperature criteria. For example, the second rate of change may be 1 degree C. per second.

In one or more example electronic devices, in accordance with the second temperature data being equal to the second rate of change, the processor circuitry 302 can be configured to determine that the second temperature range meets the second temperature criteria. For example, the second rate of change may be 1 degree C. per second.

In one or more example electronic devices, in accordance with the second temperature data being equal to or below the second rate of change, the processor circuitry 302 can be configured to determine that the second temperature range meets the second temperature criteria. In one or more example electronic devices, in accordance with the second temperature data being not equal to or below the second rate of change, the processor circuitry 302 can be configured to determine that the second temperature range does not meet the second temperature criteria. For example, the second rate of change may be 1 degree C. per second.

In one or more example electronic devices, in accordance with the second temperature data being equal to the second rate of change, the processor circuitry 302 can be configured to determine that the second temperature range meets the second temperature criteria. For example, the second rate of change may be 1 degree C. per second.

In one or more example electronic devices, in accordance with the second temperature data being equal to or above the second rate of change, the processor circuitry 302 can be configured to determine that the second temperature range does not meet the second temperature criteria. In one or more example electronic devices, in accordance with the second temperature data being not equal to or above the second rate of change, the processor circuitry 302 can be configured to determine that the second temperature range meets the second temperature criteria. For example, the second rate of change may be 1 degree C. per second.

The second temperature criteria may be a second temperature threshold. In one or more example electronic devices, in accordance with the second temperature data being above the second temperature threshold, the processor circuitry 302 can be configured to determine that the second temperature range does not meet the second temperature criteria. In one or more example electronic devices, in accordance with the second temperature data being not above the second temperature threshold, the processor circuitry 302 can be configured to determine that the second temperature range meets the second temperature criteria. For example, the second temperature threshold can be the operating temperature of the electronic device 300 plus 10 degrees C.

In one or more example electronic devices, in accordance with the second temperature data being below the second temperature threshold, the processor circuitry 302 can be configured to determine that the second temperature range meets the second temperature criteria. In one or more example electronic devices, in accordance with the second temperature data not being below the second temperature threshold, the processor circuitry 302 can be configured to determine that the second temperature range does not meet the second temperature criteria. For example, the second temperature threshold can be the operating temperature of the electronic device 300 plus 10 degrees C.

In one or more example electronic devices, in accordance with the second temperature data being equal to the second temperature threshold, the processor circuitry 302 can be configured to determine that the second temperature range does not meet the second temperature criteria. For example, the second temperature threshold can be the operating temperature of the electronic device 300 plus 10 degrees C.

In one or more example electronic devices, in accordance with the second temperature data being equal to the second temperature threshold, the processor circuitry 302 can be configured to determine that the second temperature range meets the second temperature criteria. For example, the second temperature threshold can be the operating temperature of the electronic device 300 plus 10 degrees C.

In one or more example electronic devices, in accordance with the second temperature data being equal to or above the second temperature threshold, the processor circuitry 302 can be configured to determine that the second temperature range does not meet the second temperature criteria. In one or more example electronic devices, in accordance with the second temperature data being not equal to or above the second temperature threshold, the processor circuitry 302 can be configured to determine that the second temperature range meets the second temperature criteria. For example, the second temperature threshold can be the operating temperature of the electronic device 300 plus 10 degrees C.

In one or more example electronic devices, the second temperature criteria can be the same as the first temperature criteria. In one or more example electronic devices, the second temperature criteria can be different from the first temperature criteria. For example, the second temperature criteria may be a second temperature threshold higher than that of the first temperature criteria having a first temperature threshold.

For example, the processor circuitry 302 can be configured to determine whether the second generated temperature data meets the second temperature criteria at the second time, which can comprise that the processor circuitry 302 can be configured to determine whether the second generated temperature data is equal to or above a second temperature threshold at the second time.

In one or more example electronic devices, in accordance with the determination that the second generated temperature data meets the second temperature criteria at the second time, the processor circuitry 302 can be configured to generate a second temperature parameter based on the second generated temperature data at the second time. The second temperature parameter can be data. The second temperature parameter can be an indicator. The second temperature parameter can be indicative of the second generated temperature data.

In accordance with the determination that the second generated temperature data meets the second temperature criteria at the second time, the processor circuitry 302 is configured to transmit an all-clear signal. In one or more example electronic devices, in accordance with the determination that the second temperature data meets the second temperature criteria at the second time, the processor circuitry 302 can be configured to generate the all-clear signal. In accordance with the determination that the second generated temperature data meets the second temperature criteria at the second time, the processor circuitry 302 is configured to transmit, to one or more second electronic device(s) the all-clear signal.

For example, the processor circuitry 302 can transmit the all-clear signal via the interface circuitry 303. The transmitting, such as sending, providing, communicating, messaging, signaling, can be, for example, wired or wirelessly transmitting. The transmitting can be direct transmitting. For example, between the electronic device 300 and the one or more second electronic device(s). The transmitting can be indirect transmitting, such as via the Internet or an intermediate device. The transmitting can be to a single second electronic device. The transmitting can be to a plurality of second electronic devices.

The all-clear signal can be data indicative of a false alarm. The all-clear signal can be data indicative of a lack of a fire hazard.

In one or more example electronic devices, in accordance with the determination that the second generated temperature data does not meet the second temperature criteria at the second time, the electronic device 300 is configured to transmit a fire confirmation signal indicative of a fire. In one or more example electronic devices, in accordance with the determination that the second generated temperature data does not meet the second temperature criteria at the second time, the electronic device 300 is configured to not transmit the all-clear signal. In one or more example electronic devices, in accordance with the determination that the second generated temperature data does not meet the second temperature criteria at the second time, the electronic device 300 is configured to transmit, to the one or more second electronic device(s), a fire confirmation signal indicative of a fire and to not transmit the all-clear signal.

For example, if the second temperature criteria is the second generated temperature data being below a second temperature threshold, and the second generated temperature data does not meet the second temperature criteria, this may indicate, or confirm, that the fire is occurring and the alarm signal was not a false alarm. The processor circuitry 302 can then short-circuit, or cut off, the all-clear signal. Further, the processor circuitry 302 can be configured to send a fire confirmation signal, which signals other devices that there is a fire. In one or more example electronic devices, the electronic device may be configured to receive a fire confirmation signal from a second device. If the electronic device 300 receives a fire confirmation signal, the electronic device 300 may be configured to not wait for an all-clear signal, but instead move directly to trigger an alarm indicative of a fire.

In one or more example electronic devices, the processor circuitry 302 can be configured to transmit the alarm signal and/or the all-clear signal to a server device.

In one or more example electronic devices, the electronic device 300 can be configured for device-to-device communication. In one or more example electronic devices, the electronic device 300 can be configured for device-to-server communication. In one or more example electronic devices, the electronic device 300 can be configured for device to device and device to server communication.

In one or more example electronic devices, the processor circuitry 302 can be configured to determine a model of device operating temperatures. This can be based on operating temperatures of the electronic device 300 at operating times. In one or more example electronic devices, the processor circuitry 302 is configured to determine the first temperature criteria and/or the second temperature criteria based on the model. The operating temperatures can be operating temperatures of the electronic device 300 for its primary function. The operating times can be operating times of the electronic device 300 for its primary function. The temperature criteria may be the temperature of the electronic device 300 being outside the device operating temperatures.

In one or more example electronic devices, the model may include machine learning. In one or more example electronic devices, the model may include artificial intelligence. The machine learning may be a machine learning scheme. The artificial intelligence may be an artificial intelligence scheme.

In one or more example electronic devices, the model can comprise a regression model. The model can be a neural network (NN) regression model (such as a feed forward neural network). The model can be a random forest (RF) regression model. The model can be configured to perform regression analysis. The model can use a set of statistical processes for estimating a relationship between a dependent variable and one or more independent variables. The model can be configured to perform a linear regression.

In one or more example electronic devices, the input to the model, such as a feed forward neural network model or a random forest model, can be vectors of independent variables. One or more of the input, such as independent, variables can be dependent on another input, such as independent, variable in some instances. One or more of the independent variables can be fully independent from another independent variable in some instances. In one or more example electronic devices, multicollinearity can be dealt with for the independent variables prior to being input into the model. With the dependent variable given, training can be performed by backward propagation and ensemble methods for NN models and RF models, respectively.

For example, the model can receive input of different temperatures at specific times. Based on this input, the model may be configured to generate the first and/or second temperature criteria. For example, if electronic device 300 is a computer, the model may be configured to generate first temperature criteria and/or second temperature criteria based on an understanding of operation times and temperatures of the electronic device 300. Temperatures outside the "normal", such as temperatures outside of the modeled operating temperatures, may be indicative of a fire hazard, which can be represented by meeting a first temperature criteria. The first temperature criteria and/or the second temperature criteria may vary during a day. For example, if the electronic device is not typically used from 01:00-04:00, the first temperature criteria may be lower than that at normal working hours.

In one or more example electronic devices, the electronic device 300 can be configured to receive input from another device. In particular, the electronic device 300 can be configured to receive input from another device that may not be connected to the electronic device 300. For example, the electronic device 300 can be configured to receive input from a non-IoT device.

In one or more example electronic devices, the electronic device 300 can include a microphone. In accordance to the microphone receiving an auditory signal indicative of a fire, the electronic device 300 may be configured to transmit a fire confirmation signal indicative of a fire. In accordance to the microphone receiving an auditory signal indicative of a fire, the electronic device 300 may be configured to transmit, to the one or more second electronic device(s), a fire confirmation signal indicative of a fire. In accordance to the microphone not receiving an auditory signal indicative of a fire, the electronic device 300 is configured to not transmit a fire confirmation signal. The fire confirmation signal can be the fire confirmation signal discussed above. For example, an electronic device 300 can use a microphone to detect a fire alarm sounding and relay the alarm to other collaborating devices.

For example, the electronic device 300 can receive an auditory signal from a signalling, such as beeping, fire alarm. As the signalling fire alarm is indicative of a fire, the electronic device 300 can be configured to transmit the fire confirmation signal. The electronic device 300 may also be configured to receive light-based, motion-based, or visual-based signals indicative of a fire as well. The electronic device 300 can be configured to receive signals from non-connected, such as non-IoT, devices.

In one or more example electronic devices, the electronic device 300 can similarly receive one or more signals from one or more second electronic device(s). In one or more example electronic devices, the electronic device 300 can be configured to receive an outside alarm signal and/or an outside all-clear signal. In one or more example electronic devices, the electronic device 300 can be configured to receive an outside alarm signal and/or an outside all-clear signal from at least one of the one or more second electronic device(s). In accordance with the electronic device 300 receiving the outside alarm signal but not the outside all-clear signal, the processor circuitry 302 is configured to trigger an alarm indicative of a fire. In accordance with the electronic device 300 receiving the outside alarm signal and the outside all-clear signal, the processor circuitry 302 is configured to not trigger an alarm indicative of a fire. In accordance with the electronic device 300 not receiving the outside alarm signal, the processor circuitry 302 is configured to trigger an alarm indicative of a fire.

For example, the processor circuitry 302 can be configured to receive the outside alarm signal and/or the outside all-clear signal via the interface circuitry 303. The receiving, such as accepting, can be, for example, wired or wirelessly receiving. The receiving can be direct receiving. For example, between the electronic device 300 and the one or more second electronic device(s). The receiving can be indirect receiving, such as via the Internet or an intermediate device. The receiving can be from a single second electronic device. The receiving can be from a plurality of second electronic devices.

The electronic device 300 can be configured to have a time period between when receiving the outside alarm signal until triggering an alarm without receiving an outside all-clear signal. This can in one or more example electronic devices be set manually. This may in one or more example electronic devices be set by the model discussed herein. The time period may be, for example, 1, 2, 3, 4, 5, 6, 7, 8, 9, 10, 15, 20, 25, 30, 35, 40, 45, 50, 55, or 60 seconds, though the time period is not limiting.

The alarm can be an indicator to a user that there is a fire hazard. In one or more example electronic devices, the alarm can be an auditory alarm. In one or more example electronic devices, the alarm can be a visual alarm. In one or more example electronic devices, the alarm can be an auditory alarm and/or a visual alarm.

For example, the electronic device 300 can be configured to make a beeping noise and/or flash one or more lights. These can indicate to a user that there may be a fire.

In one or more example electronic devices, the electronic device 300 can be a speaker, a personal computer, a laptop, a tablet, a mobile communication device, or a television. Other electronic devices can be one or more of a refrigerator, e-reader, conference device, smart lock, cleaning device, light, gaming system, pollution monitor, temperature controller, and doorbell. The particular electronic device is not limiting.

In one or more example electronic devices, the primary function of the electronic device 300 can be to act as a speaker, a personal computer, a laptop, a tablet, a mobile communication device, gaming system, or a television. For example, the primary function of the electronic device 300 can be playing music, projecting visuals on a screen, word processing, playing games, cellular communication, etc.

Advantageously, a consumer electronic device having a different primary function than detecting a fire hazard can be modified and used for a secondary purpose of detecting a fire hazard. This may remove the need for dedicated fire alarms, while also providing useful information about a fire hazard.

In one or more example electronic devices, the processor circuitry 302 can be configured to transmit the alarm signal and/or the all-clear signal between homes in a neighborhood to notify of an approaching fire hazard.

In one or more example electronic devices, the processor circuitry 302 can be configured to calculate spread and/or direction of the fire hazard. For example, the processor 302 circuitry can utilize time and location data of the other electronic devices when other electronic devices have transmitted alarm signal(s).

In one or more example electronic devices, the processor circuitry 302 can be configured to calculate lack of spread and/or lack of direction of the fire hazard. For example, the processor 302 circuitry can utilize time and location data of the other electronic devices when other electronic devices have not transmitted alarm signal(s).

In one or more example electronic devices, the processor circuitry 302 can be configured to notify a user of a fire hazard. For example, via a text message and/or a sound message.

In one or more example electronic devices, the processor circuitry 302 can be configured to notify emergency personal, such as fire and rescue services, of the fire hazard. This can include the extend, direction, and/or speed of the fire hazard.

Figure 2:
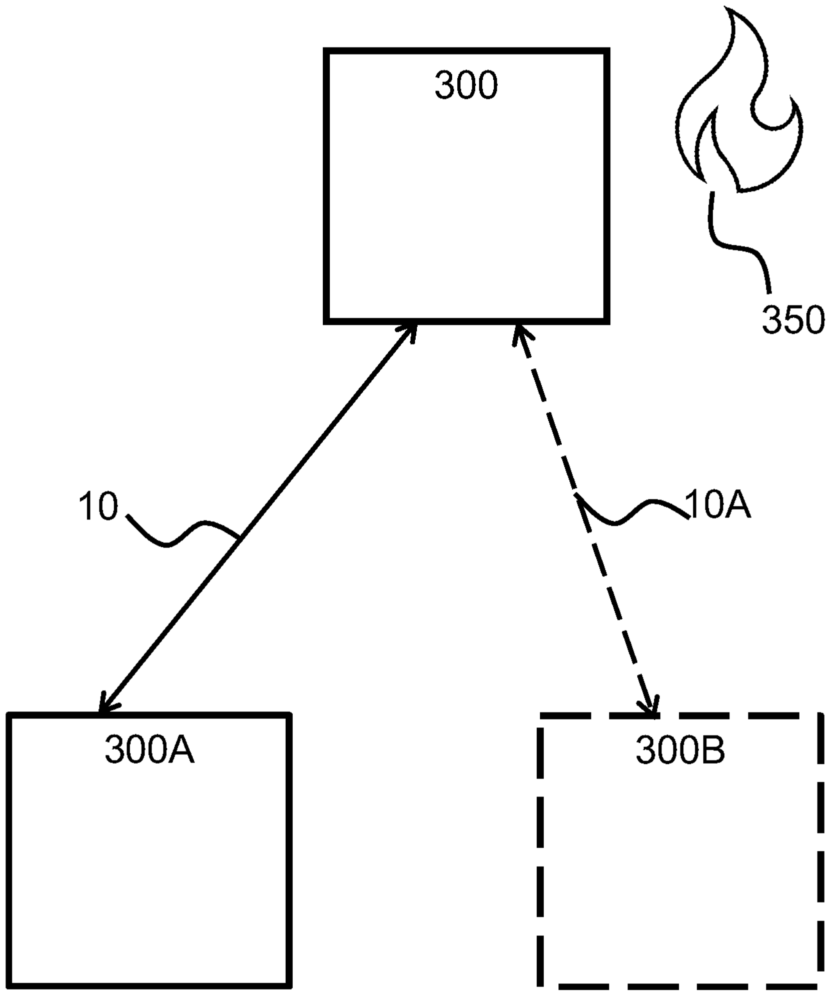
FIG. 2 is a diagram illustrating an electronic device according to this disclosure.

In one or more example electronic devices, the processor circuitry 302 can communication with other locations, such as homes, to create a sequence of sound messages and/or light alerts as a path to guide a user away from the fire hazard within the neighborhood FIG. 2 is diagram illustrating an electronic device 300 according to this disclosure. For example, electronic device 300 can be a computer having a CPU and the temperature sensor within. As discussed above, the electronic device 300 can utilize a model correlating CPU loads and temperatures over time for the primary purpose of the electronic device 300, thereby learning the range of temperatures under normal operating conditions for generation of the first temperature criteria and/or the second temperature criteria.

As shown, a fire hazard 350 may be near enough to the electronic device 300 for the temperature sensor 304 of the electronic device 300 to generate temperature data that meets the first temperature criteria at the first time. Accordingly, the electronic device 300 is configured to transmit 10 to a first electronic device 300A of the one or more second electronic devices an alarm signal (and optionally transmit 10A to a second electronic device 300B of the one or more second electronic devices).

For example, when the electronic device 300 detects an extreme temperature outside the normal range, thereby meeting the first temperature criteria, it sends a first warning to all collaborating devices, such as electronic devices, in the form of the alarm signal.

As the fire hazard 350 remains, the second generated temperature data would not meet the second temperature criteria. Thus, the electronic device 300 would not transmit 10 the all-clear signal to the first electronic device 300A of the one or more second electronic devices (and optionally not transmit 10A to a second electronic device 300B of the one or more second electronic devices). This could include the electronic device 300 being destroyed by the fire hazard 350, as it would be unable to transmit the all-clear signal. The first electronic device electronic device 300A of the one or more second electronic devices would then send an alarm for a user.

In some instances with the fire hazard 350 remaining, the electronic device 300 would transmit 10 (and optionally transmit 10A) a fire confirmation signal indicative of a fire hazard. The electronic device 300 could transmit 10 (and optionally transmit 10A) a plurality of fire confirmation signals. The fire confirmation signals may have increased frequency depending on time. The transmitting 10 of fire confirmation signals at increased frequency could be configured to modify behavior of the first electronic device 300A. For example, a time period until the first electronic device 300A would trigger an alarm indicative of a fire could be shortened upon receipt of fire signals at increased frequency from the electronic device 300.

Figure 3:
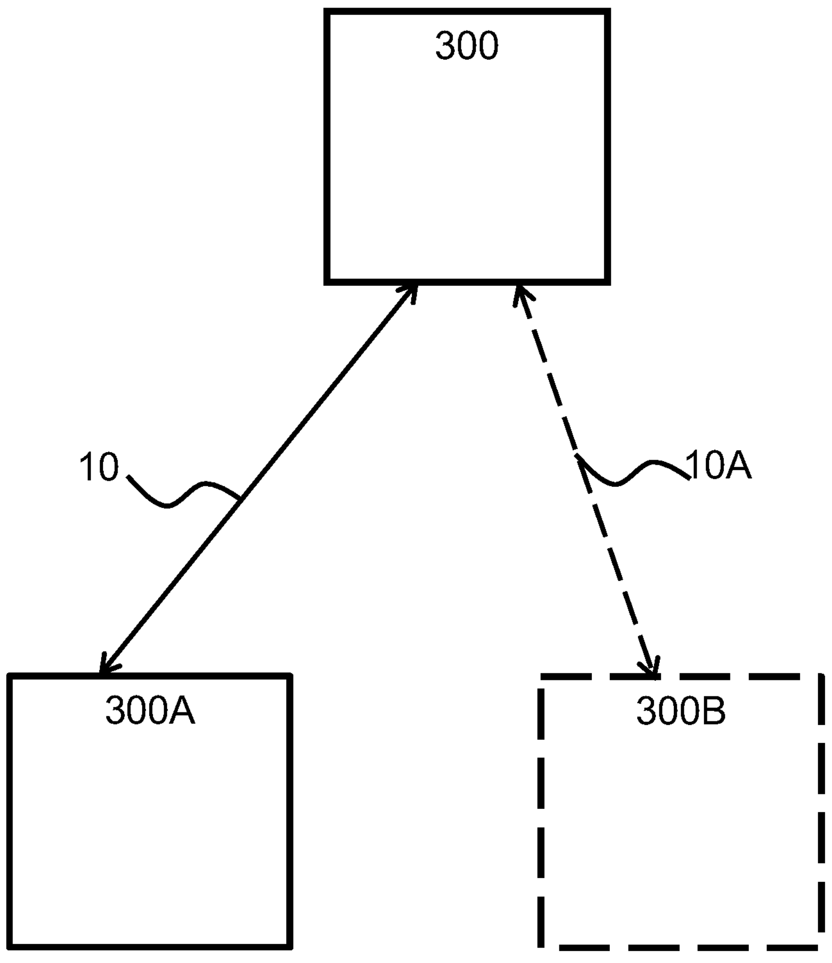
FIG. 3 is a diagram illustrating an electronic device according to this disclosure.

FIG. 3 is diagram illustrating an electronic device 300 according to this disclosure. As shown, there is no fire hazard like in FIG. 2. However, the electronic device 300 here can be a computer and may have an overheating CPU, which causes the temperature sensor 304 of the electronic device 300 to generate temperature data that meets the first temperature criteria at the first time. Accordingly, the electronic device 300 is configured to transmit 10 to a first electronic device 300A of the one or more second electronic devices an alarm signal (and optionally transmit 10A to a second electronic device 300B of the one or more second electronic devices).

As there is no fire hazard, and the electronic device 300 slows down to cool the CPU, the second generated temperature data would meet the second temperature criteria. For example, the temperature could reduce to a normal operating range within the time period. Thus, the electronic device 300 would transmit 10 the all-clear signal to the first electronic device 300A of the one or more second electronic devices (and optionally transmit 10A to a second electronic device 300B of the one or more second electronic devices). The first electronic device 300A of the one or more second electronic devices would then not send an alarm to a user as the original alarm signal was a false alarm. Accordingly, false alarms could be reduced or prevented.

Figure 4:
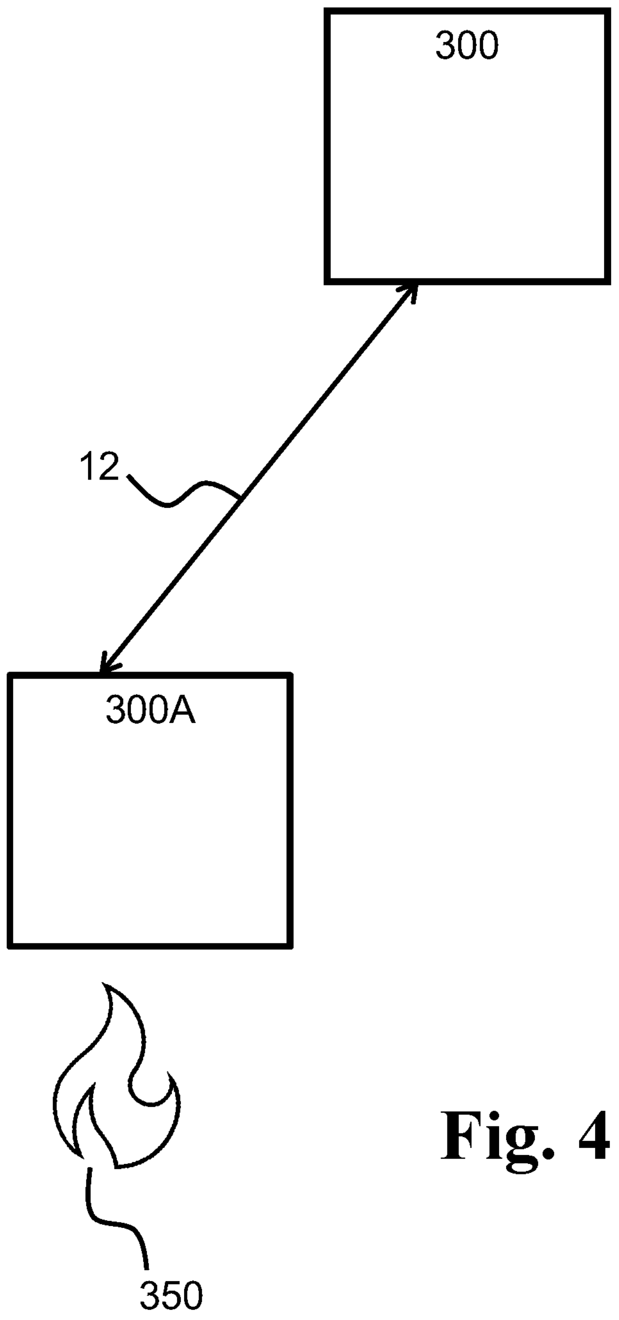
FIG. 4 is a diagram illustrating an electronic device according to this disclosure.

FIG. 4 indicates a scenario where the fire hazard 350 is close to the first electronic device 300A of the one or more second electronic devices. The electronic device 300 may receive 12 from a first electronic device 300A of the one or more second electronic devices an outside alarm signal to the electronic device 300. As the electronic device 300 would not receive, from the first electronic device 300A of the one or more second electronic devices, an outside all-clear signal, the electronic device 300 would trigger an alarm.

If there were no fire, the electronic device 300 may receive, from the first electronic device 300A of the one or more second electronic devices, an all-clear signal, and the electronic device 300 would not take any action.

Figure 5:
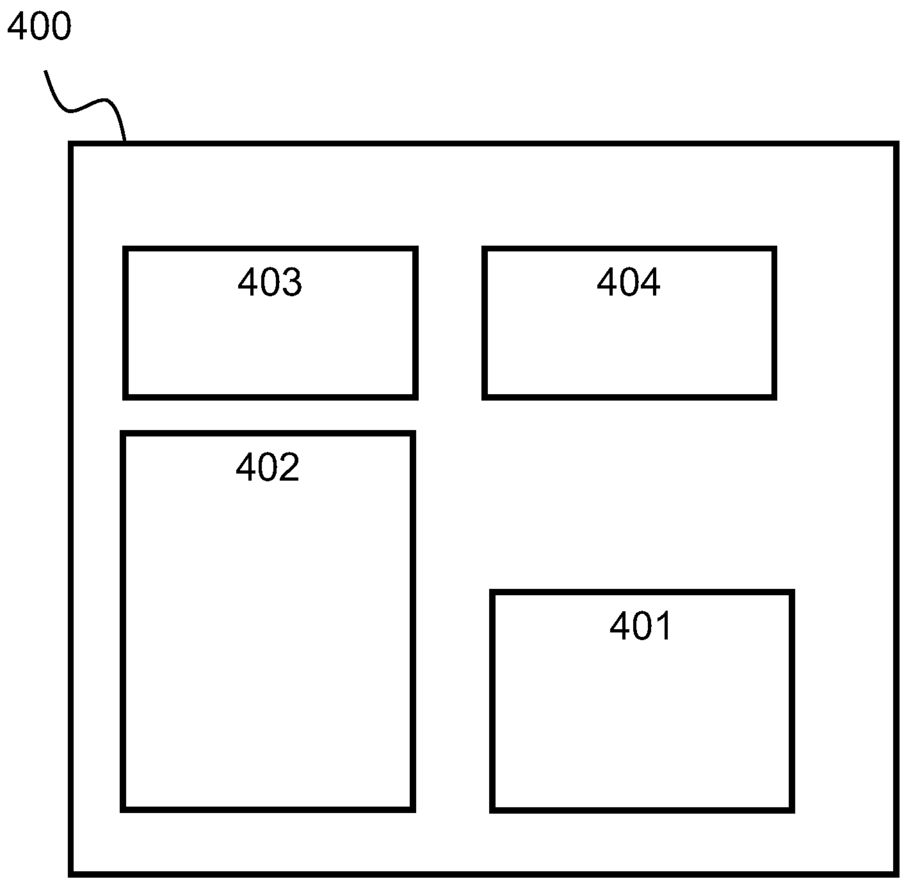
FIG. 5 is a block diagram illustrating an example mobile communication device according to this disclosure.

FIG. 5 shows a block diagram of an example mobile communication device 400 according to the disclosure. The mobile communication device 400 can be, for example, a cellular phone, a mobile phone, a smart phone, a tablet, a computer, a smart watch, wireless device, or user equipment. The mobile communication device 400 can include any or all features of the electronic device 300 disclosed above.

The mobile communication device 400 comprises memory circuitry 401. The mobile communication device 400 comprises processor circuitry 402. The mobile communication device 400 comprises interface circuitry 403, for example for wired and/or wireless communications. The mobile communication device 400 comprises display circuitry 404.

In one or more example mobile communication devices, the mobile communication device 400 comprises memory circuitry 401. In one or more example mobile communication devices, the mobile communication device 400 comprises interface circuitry 403. In one or more example mobile communication devices, the interface circuitry 403 is configured to receive an alarm signal. In one or more example mobile communication devices, the interface circuitry 403 is configured to receive an all-clear signal. In one or more example mobile communication devices, the interface circuitry 403 is configured to receive an alarm signal and an all-clear signal from an electronic device. The electronic device may be the electronic device 300 discussed above. In one or more example mobile communication devices, alarm signal can comprise electronic location data. The electronic location data can be indicative of a location of the electronic device. In one or more example mobile communication devices, the mobile communication device 400 comprises processor circuitry 402. In one or more example mobile communication devices, the mobile communication device 400 comprises display circuitry 404. In one or more example mobile communication devices, the processor circuitry 402 is configured to in accordance with the mobile communication device 400 receiving the alarm signal, wait for an alarm time. In one or more example mobile communication devices, the processor circuitry 402 is configured to in accordance with the mobile communication device not receiving the all-clear signal within the alarm time, generate a fire confirmation signal. The fire confirmation signal can be indicative of a fire. In one or more example mobile communication devices, the processor circuitry 402 is configured to in accordance with the mobile communication device not receiving the all-clear signal within the alarm time, display an alarm display. The alarm display may be indicative of a fire confirmation signal. In one or more example mobile communication devices, the processor circuitry 402 is configured to in accordance with the mobile communication device not receiving the all-clear signal within the alarm time, display, via the display circuitry 404, an alarm display.

The alarm signal can be the alarm signal discussed above. The all-clear signal may be the all-clear signal discussed above.

In one or more example mobile communication devices, the processor circuitry 402 is configured to, in accordance with the mobile communication device 400 not receiving the alarm signal, not wait for an alarm time.

In one or more example mobile communication devices, the processor circuitry 402 is configured to in accordance with the mobile communication device receiving the all-clear signal within the alarm time, not generate a fire confirmation signal. In one or more example mobile communication devices, the processor circuitry 402 is configured to in accordance with the mobile communication device receiving the all-clear signal within the alarm time, not display an alarm display.

In one or more example mobile communication devices, the electronic location data can be indicative of a location of the electronic device. For example, the electronic location data can be global positioning system data.

In one or more example mobile communication devices, the alarm time can be set manually. The alarm time can be set automatically. The alarm time can be set by a model.

The alarm time may begin when the mobile communication device 400 receives the outside alarm signal. It may be the time from receiving the outside alarm signal to generating a fire confirmation signal and displaying an alarm display as discussed herein.

The alarm time can act as a time period between the mobile communication device 400 receiving the outside alarm signal and not receiving the outside all-clear signal, which can be indicative of a fire hazard. The alarm time can be shortened, such as ended, by receiving a secondary alarm signal as discussed above. The alarm time may be, for example, 1, 2, 3, 4, 5, 6, 7, 8, 9, 10, 15, 20, 25, 30, 35, 40, 45, 50, 55, or 60 seconds, though the alarm time is not limiting.

In one or more example mobile communication devices, the fire confirmation signal can be data indicative of a fire, such as a fire hazard. The fire confirmation signal can include location data of the fire. For example, the fire confirmation signal can include the electronic location data of the alarm signal.

In one or more example mobile communication devices, the alarm display can be indicative of the fire confirmation signal. The alarm display may be text data, such as a warning message. The alarm display may be auditory, such as an alarm sound. The alarm display may include more functionality, such as parameters of the fire hazard. The alarm display can be display on, for example, a screen of the mobile communication device. The alarm display may be configured to take precedence over any other operations of the mobile communication device.

In one or more example mobile communication devices, in accordance with the mobile communication device 400 not receiving the all-clear signal within the alarm time, the processor circuitry 402 can be configured to determine a fire parameter indicative of one or more of: a location, spread and a direction of the fire. In one or more example mobile communication devices, in accordance with the mobile communication device 400 not receiving the all-clear signal within the alarm time, the processor circuitry 402 can be configured to determine, based on the alarm signal, a fire parameter indicative of one or more of: a location, spread and a direction of the fire. In one or more example mobile communication devices, in accordance with the mobile communication device 400 not receiving the all-clear signal within the alarm time, the processor circuitry 402 can be configured to determine, based on the alarm signal and/or a second alarm signal from a second electronic device wherein the second alarm signal comprises second electronic location data indicative of a location of the second electronic device, a fire parameter indicative of one or more of: a location, spread and a direction of the fire.

In one or more example mobile communication devices, in accordance with the mobile communication device 400 not receiving the all-clear signal within the alarm time, the processor circuitry 402 can be configured to transmit the fire confirmation signal within a predetermined area. In one or more example mobile communication devices, in accordance with the mobile communication device 400 not receiving the all-clear signal within the alarm time, the processor circuitry 402 can be configured to transmit the fire parameter to one or more electronic devices within a predetermined area. In one or more example mobile communication devices, in accordance with the mobile communication device 400 not receiving the all-clear signal within the alarm time, the processor circuitry 402 can be configured to transmit the fire confirmation signal and the fire parameter to one or more electronic devices within a predetermined area.

In one or more example mobile communication devices, the processor circuitry 402 can be configured to determine and/or generate a fire parameter. The fire parameter may include data regarding a fire hazard. This can include, for example, one or more of a location, spread, direction, temperature, and movement of a fire, or a fire hazard. The mobile communication device 400 can be configured to receive one or more alarm signals from one or more electronic devices in order to determine the fire parameter. For example, the processor circuitry 402 may determine the movement of a fire hazard from a top of a building towards a bottom of a building based on subsequent alarm signals from electronic devices starting from the top and moving towards the bottom.

In one or more example mobile communication devices, the predetermined area, such as a predetermined location, predetermined building, predetermined home, predetermined neighbourhood, may be set, for example by a user or a factory setting. The predetermined area may be the maximum transmission radius of the mobile communication device. The predetermined area may be the maximum wireless radius of the mobile communication device. The predetermined area may include a fire station, or other firefighting system.

In one or more example mobile communications devices, the alarm display can comprise a layout display. The layout display can be based on layout data. The layout data can be a map. The layout data can be indicative of a layout of a location. The layout display can be based on mobile location data. The mobile location data can be indicative of a location of the mobile communication device. In one or more example mobile communications device, the alarm display can comprise a layout display based on layout data indicative of a layout of a location and mobile location data indicative of a location of the mobile communication device.

In one or more example mobile communication devices, the processor circuitry 402 can be configured to determine an evacuation route parameter. The evacuation route parameter can be indicative of an evacuation route for the location based on the layout data, the alarm signal, and the mobile location data. In one or more example mobile communication devices, the processor circuitry 402 can be configured to determine an evacuation route parameter. The evacuation route parameter can be indicative of an evacuation route for the location based on one or more of the layout data, the alarm signal, and the mobile location data.

In one or more example mobile communication devices, the alarm display can comprise an evacuation route display. The evacuation route display can be based on the evacuation route parameter.

In one or more example mobile communication devices, the alarm display can comprise a layout display. The layout display can be displayed via the display circuitry 404 as discussed below. The layout display can be based on layout data. The layout data can be indicative of a layout of a location. For example, the layout display can be a floor map of a particular location, such as a building or home. The layout display can also be based on mobile location data. The mobile communication data can be indicative of a location of the mobile communication device. For example, the layout display can show a floor map with a location of the mobile communication device. As discussed above, the alarm display can also be indicative of the fire confirmation signal. The fire hazard can be displayed as well on the mobile communication device so that a user can understand where the danger is.

In one or more example mobile communication devices, the processor circuitry 402 can be configured to determine an evacuation route parameter. The evacuation route parameter can be indicative of a determined evacuation route. This can be based on the layout data, the alarm data, and the mobile location data. The mobile communication device 400 can utilize a model for determining the evacuation route in order to provide proper guidance to a user.

In one or more mobile communication devices, the mobile communication device 300 can provide an alarm display visually showing an evacuation route. The evacuation route can be shown with the layout display, which can provide a user guidance for escaping a location. Further, the electronic device, the second electronic device, and/or the mobile communication device 400 can communication to provide evacuation guidance to a user. For example, they could generate a sequence of sound messages and/or light alerts as a path to guide a user away from the detected fire hazard and towards an exit.

The electronic device 400 can be configured to display one or more user interface objects. The display circuitry 404 may be a screen. For example, the screen may be a screen comprised in a mobile phone, such as a smart phone screen. The display circuitry 404 may be a touch screen. The display circuitry 404 may be a monitor. The display circuitry 404 may be a visual screen. The display circuitry 404 may be one or more of: a screen, a touch screen, a monitor, and a visual screen.

A user interface object refers herein to a graphical representation of an object that is displayed on the display, such as via display circuitry 404, of the electronic device 400. The user interface object may be user-interactive, or selectable by a user input. For example, an image (e.g., icon), a button, and text (e.g., hyperlink) each optionally constitute a user interface object. The user interface object may form part of a widget. A widget may be seen as a mini-application that may be used by the user, and created by the user. A user interface object may comprise a prompt, application launch icon, and/or an action menu.

The display circuitry 404 may be configured to display visual output to a user. The visual output optionally comprises graphics, text, icons, video, and any combination thereof (collectively termed "graphics"). For example, some or all of the visual output may be seen as corresponding to user-interface objects.

The processor circuitry 402 of the electronic device 400 may be configured to display, on the display, one or more user interfaces, such as user interface screens, including a first user interface and/or a second user interface. A user interface may comprise one or more, such as a plurality of, user interface objects. For example, a first user interface may comprise one or more of the: first user interface object, second user interface object, third user interface object, and fourth user interface object disclosed herein.

A user interface object, such as the first user interface object and/or the second user interface object and/or the third user interface object and/or a fourth user interface object, may represent mobile location data, the layout data, the electronic location data, and the evacuation route parameter, respectively.

Figure 6:
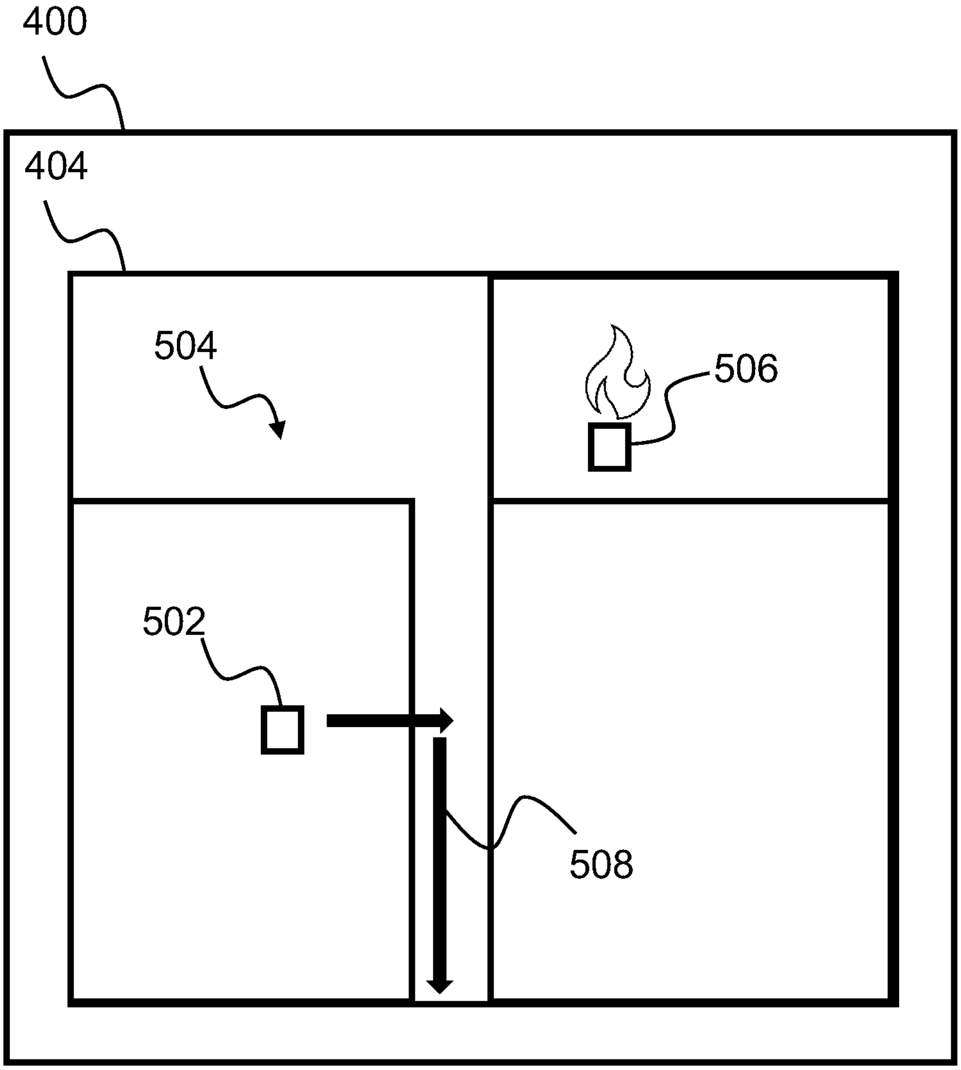
FIG. 6 is a diagram illustrating a mobile communication device according to this disclosure.

The display circuitry 404 of the mobile communication device 400 can be configured to display one or more of the first user interface object 502, the second user interface object 504, the third user interface object 506, and the fourth user interface object 508, such as shown in FIG. 6.

The first user interface object 502 may comprise an icon representative of the mobile communication device 400, such as via the mobile location data. The first user interface object 502 may be number indicative of the mobile communication device 400. The first user interface object 502 may be placeholder indicative of the mobile communication device 400. The first user interface object 502 may be two dimensional and/or three dimensional.

The second user interface object 504 may be indicative of the layout data. For example, the second user interface object 504 may show a layout of a home or neighborhood, such as comprising different areas, rooms, buildings or locations. The second user interface object 504 can comprise the first user interface object. The second user interface object 504 can be in one of the different areas, rooms, or locations. The second user interface object 504 may be two dimensional and/or three dimensional.

The third user interface object 506 may comprise an icon representative of the electronic location data, which may be indicative of the electronic device determining that there is fire hazard. The third user interface object 506 may be number indicative of the electronic location data. The third user interface object 506 may be placeholder indicative of the electronic location data. The third user interface object 506 may be two dimensional and/or three dimensional.

The fourth user interface object 508 may comprise an icon representative of the evacuation route parameter. The fourth user interface object 508 may be number indicative of the evacuation route. The fourth user interface object 508 may be placeholder indicative of the evacuation route. The fourth user interface object 508 may be two dimensional and/or three dimensional.

The first user interface object 502 may be representative of the electronic device 400 and displayed with respect to the second user interface object 504. The third user interface object 506 and fourth user interface object 506 may be displayed with respect to the second user interface object 504 as well. In one or more example electronic devices, a user may be able to view their location with respect to the layout data.

For example, if the mobile communication device 400 receives the alarm signal and not the all-clear signal, the display circuitry 402 may be configured to display the first user interface object 502, representative of the location of the mobile communication device 400, the third user interface object 506, representative of the location of the electronic device providing the alarm signal and thus the likely fire hazard, and the fourth user interface object 508, representative of the evacuation route, on the second user interface object 504. This can provide a user an evacuation plan to avoid or at least reduce danger from the fire hazard.

Figure 7:
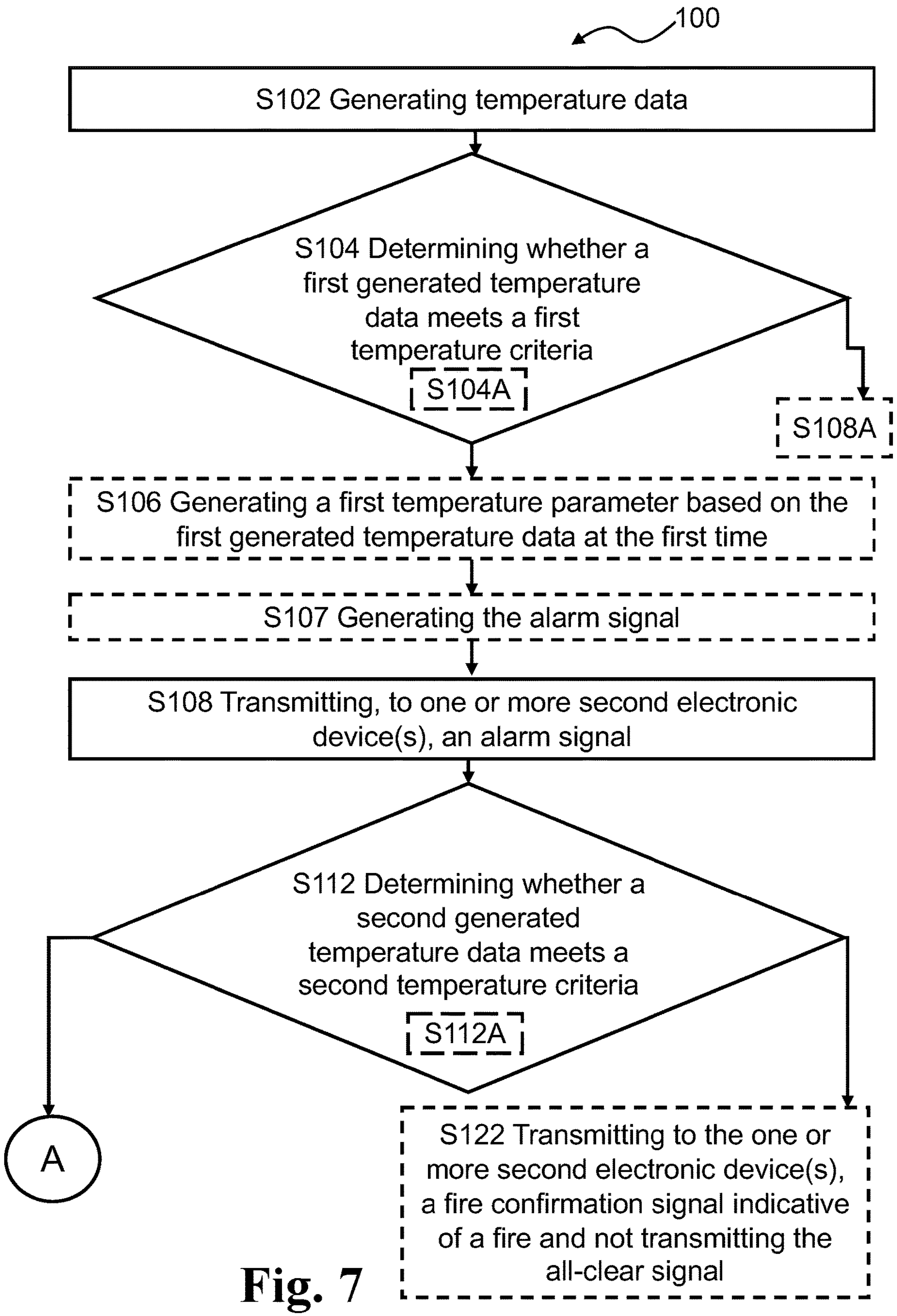
FIG. 7 is a flow-chart illustrating an example method, performed in an electronic device, for detecting a fire hazard according to this disclosure.
Figure 8:
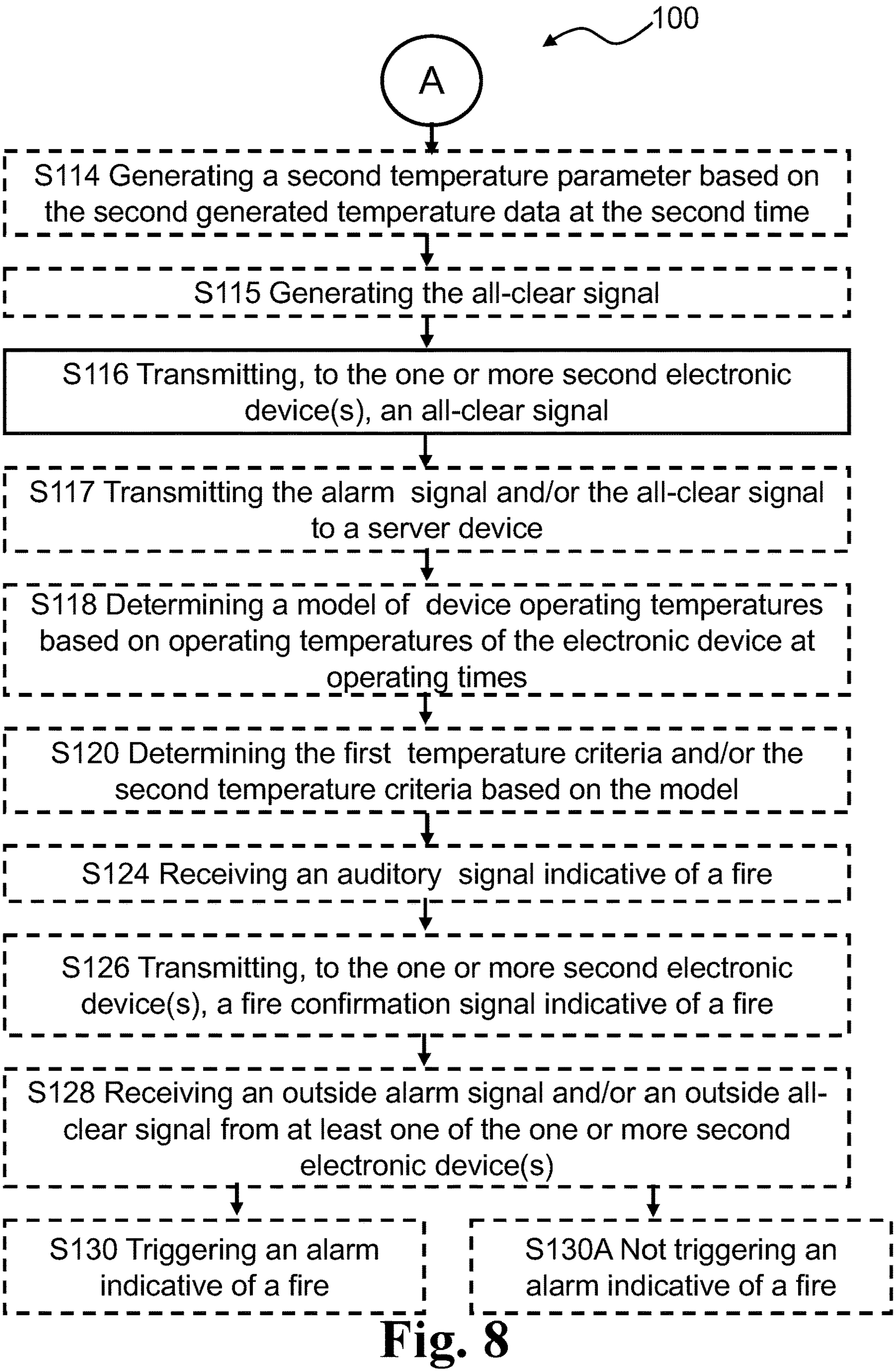
FIG. 8 is a flow-chart illustrating an example method, performed in an electronic device, for detecting a fire hazard according to this disclosure.
Figure 9:
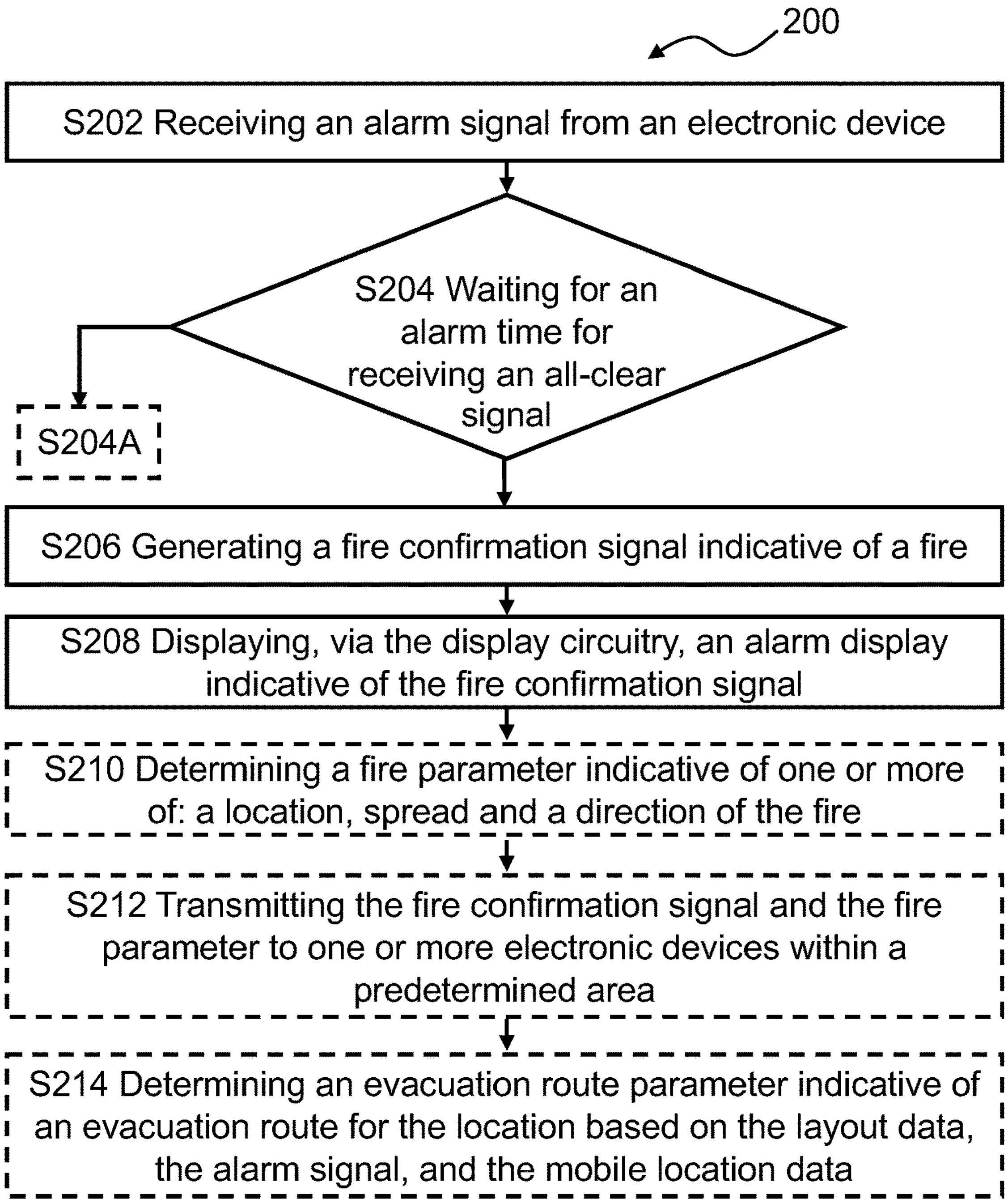
FIG. 9 is a flow-chart illustrating an example method, performed by a mobile communication device, according to this disclosure.

The electronic device 300 and/or the mobile communication device 400 is optionally configured to perform any of the operations disclosed in FIGS. 7-9 (such as any one or more of S102, S104, S104A, S106, S107, S108, S112, S112A, S114, S115, S116, S117, S118, S120, S122, S124, S126, S128, S130, S202, S204, S206, S208, S210, S212, S214). The operations of the electronic device 300 and/or the mobile communication device 400 may be embodied in the form of executable logic routines (for example, lines of code, software programs, etc.) that are stored on a non-transitory computer readable medium (for example, memory circuitry 301, 401) and are executed by processor circuitry 302, 402).

Furthermore, the operations of the electronic device 300 and/or the mobile communication device 400 may be considered a method that the electronic device 300 and/or the mobile communication device 400 is configured to carry out. Also, while the described functions and operations may be implemented in software, such functionality may also be carried out via dedicated hardware or firmware, or some combination of hardware, firmware and/or software.

Memory circuitry 301, 401 may be one or more of a buffer, a flash memory, a hard drive, a removable media, a volatile memory, a non-volatile memory, a random access memory (RAM), or other suitable device. In a typical arrangement, memory circuitry 301, 401 may include a non-volatile memory for long term data storage and a volatile memory that functions as system memory for processor circuitry 302, 402. Memory circuitry 301, 401 may exchange data with processor circuitry 302, 402 over a data bus. Control lines and an address bus between memory circuitry 301, 401 and processor circuitry 302, 402 also may be present (not shown in the figures). Memory circuitry 301, 401 is considered a non-transitory computer readable medium.

Memory circuitry 301, 401 may be configured to store information such as one or more of: temperature data, first generated temperature data, first temperature criteria, first temperature parameter, alarm signal, second generated temperature data, second temperature criteria, second temperature parameter, all-clear signal, fire confirmation signal, alarm time, fire parameter, alarm display, evacuation route parameter, layout data, and mobile location data.

FIG. 7-FIG. 8 show a flow diagram of an example method 100 performed by an electronic device according to the disclosure. The method 100 may be performed by an electronic device 300 having a primary function different than detecting a fire. The method 100 may be performed by an electronic device disclosed herein, such as electronic device 300 of FIG. 1.

The method 100 comprises generating S102 temperature data. The method 100 comprises determining S104 whether a first generated temperature data meets a first temperature criteria at a first time.

In accordance with the determination that the first generated temperature data meets the first temperature criteria at the first time, the method 100 comprises transmitting S108, to one or more second electronic device(s), an alarm signal. In accordance with the determination that the first generated temperature data does not meet the first temperature criteria at the first time, the method 100 comprises not transmitting S108A, to one or more second electronic device(s), an alarm signal.

In accordance with the determination that the first generated temperature data meets the first temperature criteria at the first time, the method 100 comprises determining S112 whether a second generated temperature data meets a second temperature criteria at a second time after the first time.

In accordance with the determination that the second generated temperature data meets the second temperature criteria at the second time, the method 100 comprises transmitting S116, to the one or more second electronic device(s), an all-clear signal. In accordance with the determination that the second generated temperature data does not meet the second temperature criteria at the second time, the method 100 comprises not transmitting S116A, to the one or more second electronic device(s), an all-clear signal.

In one or more example methods, the method 100 comprises transmitting S117 the alarm signal and/or the all-clear signal to a server device.

In one or more example methods, the method 100 comprises determining S118 a model of device operating temperatures based on operating temperatures of the electronic device at operating times.

In one or more example methods, the method 100 comprises determining S120 the first temperature criteria and/or the second temperature criteria based on the model.

In one or more example methods, in accordance with the determination S104 that the first generated temperature data meets the first temperature criteria at the first time, the method 100 comprises generating S106 a first temperature parameter based on the first generated temperature data at the first time.

In one or more example methods, in accordance with the determination S112 that the second temperature data meets the second temperature criteria at the second time, the method 100 comprises generating S114 a second temperature parameter based on the second generated temperature data at the second time.

In one or more example methods, in accordance with the determination S104 that the first generated temperature data meets the first temperature criteria at the first time, the method 100 comprises generating S107 the alarm signal.

In one or more example methods, in accordance with the determination S112 that the second temperature data meets the second temperature criteria at the second time, the method 100 comprises generating S115 the all-clear signal.

In one or more example methods, in accordance with a determination S112 that the second generated temperature data does not meet the second temperature criteria at the second time, the method 100 comprises transmitting 122, to the one or more second electronic device(s), a fire confirmation signal indicative of a fire and not transmitting the all-clear signal.

In one or more example methods, the method 100 comprises receiving S124 an auditory signal indicative of a fire.

In one or more example methods, in accordance with the receiving the auditory signal indicative of a fire, the method 100 comprises transmitting S126, to the one or more second electronic device(s), a fire confirmation signal indicative of a fire.

In one or more example methods, the method 100 comprises receiving S128 an outside alarm signal and/or an outside all-clear signal from at least one of the one or more second electronic device(s).

In one or more example methods, in accordance with the receiving the outside alarm signal but not the outside all-clear signal, the method 100 comprising triggering S130 an alarm indicative of a fire.

In one or more example methods, in accordance with the receiving the outside alarm signal and the outside all-clear signal, the method 100 comprising not triggering S130A an alarm indicative of a fire.

In one or more example methods, the alarm is an auditory alarm and/or a visual alarm.

In one or more example methods, the electronic device is a speaker, a personal computer, a laptop, a tablet, a mobile communication device, or a television.

In one or more example methods, the determining S104 whether the first generated temperature data meets the first temperature criteria at the first time comprises determining S104A whether the first generated temperature data is equal to or above a first temperature threshold at the first time.

In one or more example methods, the determining S112 whether the second generated temperature data meets the second temperature criteria at the second time comprises determining S112A whether the second generated temperature data is below a second temperature threshold at the second time.

FIG. 9 shows a flow diagram of an example method 200 performed by a mobile communication deice according to the disclosure. The method 200 may be performed by a mobile communication device disclosed herein, such as mobile communication device 400 of FIG. 5.

The method 200 comprises receiving S202 an alarm signal from an electronic device. In one or more example methods, the alarm signal comprises electronic location data indicative of a location of the electronic device.

The method 200 comprises, in accordance with receiving the alarm signal, waiting S204 for an alarm time for receiving an all-clear signal. The method 200 comprises, in accordance with not receiving the alarm signal, not waiting S204A for an alarm time for receiving an all-clear signal.

The method 200 comprises, in accordance with not receiving the all-clear signal within the alarm time, generating S206 a fire confirmation signal indicative of a fire. The method 200 comprises, in accordance with receiving the all-clear signal within the alarm time, not generating S206 a fire confirmation signal indicative of a fire.

The method 200 comprises, in accordance with not receiving the all-clear signal within the alarm time, displaying S208, via the display circuitry, an alarm display indicative of the fire confirmation signal. The method 200 comprises, in accordance with receiving the all-clear signal within the alarm time, not displaying S208, via the display circuitry, an alarm display indicative of the fire confirmation signal.

In one or more example methods, in accordance with not receiving the all-clear signal within the alarm time, the method 200 comprises determining S210, based on the alarm signal and/or a second alarm signal from a second electronic device wherein the second alarm signal comprises second electronic location data indicative of a location of the second electronic device, a fire parameter indicative of one or more of: a location, spread and a direction of the fire.

In one or more example methods, in accordance with not receiving the all-clear signal within the alarm time, the method 200 comprises transmitting S212 the fire confirmation signal and the fire parameter to one or more electronic devices within a predetermined area.

In one or more example methods, the alarm display comprises a layout display based on layout data indicative of a layout of a location and mobile location data indicative of a location of the mobile communication device.

In one or more example methods, the method 200 comprises determining S214 an evacuation route parameter indicative of an evacuation route for the location based on the layout data, the alarm signal, and the mobile location data.

In one or more example methods, the alarm display comprises an evacuation route display based on the evacuation route parameter.

Examples of methods and products (electronic device and mobile communication device) according to the disclosure are set out in the following items:

Item 1. An electronic device configured for detecting a fire, the device comprising:

memory circuitry;

interface circuitry;

processor circuitry; and a temperature sensor configured to generate temperature data;

wherein the processor circuitry is configured to:

determine whether a first generated temperature data meets a first temperature criteria at a first time; and in accordance with the determination that the first generated temperature data meets the first temperature criteria at the first time:

transmit, to one or more second electronic device(s), an alarm signal;

determine whether a second generated temperature data meets a second temperature criteria at a second time after the first time; and in accordance with the determination that the second generated temperature data meets the second temperature criteria at the second time, transmit, to the one or more second electronic device(s), an all-clear signal;

wherein the electronic device is configured to have a primary function different from the detecting a fire.

Item 2. The electronic device according to any of the preceding Items, wherein the processor circuitry is configured to transmit the alarm signal and/or the all-clear signal to a server device.

Item 3. The electronic device according to any of the preceding Items, wherein the processor circuitry is configured to determine a model of device operating temperatures based on operating temperatures of the electronic device at operating times, and wherein the processor circuitry is configured to determine the first temperature criteria and/or the second temperature criteria based on the model.

Item 4. The electronic device according to any of the preceding Items, wherein:

in accordance with the determination that the first generated temperature data meets the first temperature criteria at the first time, the processor circuitry is configured to generate a first temperature parameter based on the first generated temperature data at the first time.

Item 5. The electronic device according to any of the preceding Items, wherein:

in accordance with the determination that the second temperature data meets the second temperature criteria at the second time, the processor circuitry is configured to generate a second temperature parameter based on the second generated temperature data at the second time.

Item 6. The electronic device according to any of the preceding Items, wherein:

in accordance with the determination that the first generated temperature data meets the first temperature criteria at the first time, the processor circuitry is configured to generate the alarm signal.

Item 7. The electronic device according to any of the preceding Items, wherein:

in accordance with the determination that the second temperature data meets the second temperature criteria at the second time, the processor circuitry is configured to generate the all-clear signal.

Item 8. The electronic device according to any of the preceding Items, wherein the processor circuitry is configured to, in accordance with a determination that the second generated temperature data does not meet the second temperature criteria at the second time, transmit, to the one or more second electronic device(s), a fire confirmation signal indicative of a fire and to not transmit the all-clear signal.

Item 9. The electronic device according to any one of Items 1-7, wherein the electronic device comprises a microphone, and in accordance to the microphone receiving an auditory signal indicative of a fire, the electronic device is configured to transmit, to the one or more second electronic device(s), a fire confirmation signal indicative of a fire.

Item 10. The electronic device according to any of the preceding Items, wherein the electronic device is configured to receive an outside alarm signal and/or an outside all-clear signal from at least one of the one or more second electronic device(s) and, in accordance with the electronic device receiving the outside alarm signal but not the outside all-clear signal, the processor circuitry is configured to trigger an alarm indicative of a fire.

Item 11. The electronic device of Item 10, wherein the alarm is an auditory alarm and/or a visual alarm.

Item 12. The electronic device according to any of the preceding Items, wherein the electronic device is a speaker, a personal computer, a laptop, a tablet, a mobile communication device, or a television.

Item 13. The electronic device according to any of the preceding Items, wherein the processor circuitry being configured to determine whether the first generated temperature data meets the first temperature criteria at the first time comprises the processor circuitry being configured to determine whether the first generated temperature data is equal to or above a first temperature threshold at the first time.

Item 14. The electronic device according to any of the preceding Items, the processor circuitry being configured to determine whether the second generated temperature data meets the second temperature criteria at the second time comprises the processor circuitry being configured to determine whether the second generated temperature data is below a second temperature threshold at the second time.

Item 15. A mobile communication device comprising:

memory circuitry;

interface circuitry configured to receive an alarm signal and an all-clear signal from an electronic device, wherein the alarm signal comprises electronic location data indicative of a location of the electronic device;

processor circuitry; and display circuitry;

wherein the processor circuitry is configured to:

in accordance with the mobile communication device receiving the alarm signal, wait for an alarm time; and in accordance with the mobile communication device not receiving the all-clear signal within the alarm time, generate a fire confirmation signal indicative of a fire and display, via the display circuitry, an alarm display indicative of the fire confirmation signal.

Item 16. The mobile communication device of Item 15, wherein, in accordance with the mobile communication device not receiving the all-clear signal within the alarm time, the processor circuitry is configured to:

determine, based on the alarm signal and/or a second alarm signal from a second electronic device wherein the second alarm signal comprises second electronic location data indicative of a location of the second electronic device, a fire parameter indicative of one or more of: a location, spread and a direction of the fire; and transmit the fire confirmation signal and the fire parameter to one or more electronic devices within a predetermined area.

Item 17. The mobile communication device according to any one of Items 15-16, wherein:

the alarm display comprises a layout display based on layout data indicative of a layout of a location and mobile location data indicative of a location of the mobile communication device;

the processor circuitry is configured to determine an evacuation route parameter indicative of an evacuation route for the location based on the layout data, the alarm signal, and the mobile location data; and the alarm display comprises an evacuation route display based on the evacuation route parameter.

Item 18. A method (100), performed by an electronic device having a primary function different than detecting a fire, the method comprising:

generating (S102) temperature data;

determining (S104) whether a first generated temperature data meets a first temperature criteria at a first time; and in accordance with the determination that the first generated temperature data meets the first temperature criteria at the first time:

transmitting (S108), to one or more second electronic device(s), an alarm signal;

determining (S112) whether a second generated temperature data meets a second temperature criteria at a second time after the first time; and in accordance with the determination that the second generated temperature data meets the second temperature criteria at the second time, transmitting (S116), to the one or more second electronic device(s), an all-clear signal.

Item 19. The method according to Item 18, wherein the method comprises transmitting (S117) the alarm signal and/or the all-clear signal to a server device.

Item 20. The method according to any of Items 18-19, wherein the method comprises determining (S118) a model of device operating temperatures based on operating temperatures of the electronic device at operating times, and determining (S120) the first temperature criteria and/or the second temperature criteria based on the model.

Item 21. The method according to any of Items 18-20, wherein:

in accordance with the determination (S104) that the first generated temperature data meets the first temperature criteria at the first time, the method comprises generating (S106) a first temperature parameter based on the first generated temperature data at the first time.

Item 22. The method according to any of Items 18-21, wherein:

in accordance with the determination (S112) that the second temperature data meets the second temperature criteria at the second time, the method comprises generating (S114) a second temperature parameter based on the second generated temperature data at the second time.

Item 23. The method according to any of Items 18-22, wherein:

in accordance with the determination (S104) that the first generated temperature data meets the first temperature criteria at the first time, the method comprises generating (S107) the alarm signal.

Item 24. The method according to any of Items 18-23, wherein:

in accordance with the determination (S112) that the second temperature data meets the second temperature criteria at the second time, the method comprises generating (S115) the all-clear signal.

Item 25. The method according to any of Items 18-24, wherein, in accordance with a determination (S112) that the second generated temperature data does not meet the second temperature criteria at the second time, the method comprises transmitting (S122), to the one or more second electronic device(s), a fire confirmation signal indicative of a fire and not transmitting the all-clear signal.

Item 26. The method according to any of Items 18-25, wherein the method comprises receiving (S124) an auditory signal indicative of a fire, and in accordance with the receiving the auditory signal indicative of a fire, the method comprising transmitting (S126), to the one or more second electronic device(s), a fire confirmation signal indicative of a fire.

Item 27. The method according to any of Items 18-26, wherein the method comprises receiving (S128) an outside alarm signal and/or an outside all-clear signal from at least one of the one or more second electronic device(s) and, in accordance with the receiving the outside alarm signal but not the outside all-clear signal, the method comprising triggering (S130) an alarm indicative of a fire.

Item 28. The method according to Item 27, wherein the alarm is an auditory alarm and/or a visual alarm.

Item 29. The method according to any of Items 18-28, wherein the electronic device is a speaker, a personal computer, a laptop, a tablet, a mobile communication device, or a television.

Item 30. The method according to any of Items 18-29, wherein the determining (S104) whether the first generated temperature data meets the first temperature criteria at the first time comprises determining (S104A) whether the first generated temperature data is equal to or above a first temperature threshold at the first time.

Item 31. The method according to any of Items 18-30, wherein the determining (S108) whether the second generated temperature data meets the second temperature criteria at the second time comprises determining (S108A) whether the second generated temperature data is below a second temperature threshold at the second time.

Item 32. A method (200), performed by a mobile communication device, the method comprising:

receiving (S202) an alarm signal from an electronic device, wherein the alarm signal comprises electronic location data indicative of a location of the electronic device;

in accordance with receiving the alarm signal, waiting (S204) for an alarm time for receiving an all-clear signal; and in accordance with not receiving the all-clear signal within the alarm time, generating (S206) a fire confirmation signal indicative of a fire and displaying (208), via the display circuitry, an alarm display indicative of the fire confirmation signal.

Item 33. The method according to Item 32, wherein, in accordance with not receiving the all-clear signal within the alarm time, the method comprises:

determining (S210), based on the alarm signal and/or a second alarm signal from a second electronic device wherein the second alarm signal comprises second electronic location data indicative of a location of the second electronic device, a fire parameter indicative of one or more of: a location, spread and a direction of the fire; and transmitting (S212) the fire confirmation signal and the fire parameter to one or more electronic devices within a predetermined area.

Item 34. The method according to Items 32-33, wherein:

the alarm display comprises a layout display based on layout data indicative of a layout of a location and mobile location data indicative of a location of the mobile communication device;

the method comprises determining (S214) an evacuation route parameter indicative of an evacuation route for the location based on the layout data, the alarm signal, and the mobile location data; and the alarm display comprises an evacuation route display based on the evacuation route parameter.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device configured for detecting a fire, the device comprising:

memory circuitry;

interface circuitry;

processor circuitry; and a temperature sensor configured to generate temperature data;

wherein the processor circuitry is configured to:

determine whether a first generated temperature data meets a first temperature criteria at a first time; and in accordance with the determination that the first generated temperature data meets the first temperature criteria at the first time:

transmit, to one or more second electronic device(s), an alarm signal;

determine whether a second generated temperature data meets a second temperature criteria at a second time after the first time; and in accordance with the determination that the second generated temperature data meets the second temperature criteria at the second time, transmit, to the one or more second electronic device(s), an all-clear signal;

wherein the electronic device is configured to have a primary function different from the detecting a fire, wherein the processor circuitry is configured to determine a model of device operating temperatures based on operating temperatures of the electronic device at operating times, and wherein the processor circuitry is configured to determine the first temperature criteria and/or the second temperature criteria based on the model.

2. The electronic device according to claim 1, wherein:

in accordance with the determination that the first generated temperature data meets the first temperature criteria at the first time, the processor circuitry is configured to generate a first temperature parameter based on the first generated temperature data at the first time.

3. The electronic device according to claim 1, wherein: in accordance with the determination that the second temperature data meets the second temperature criteria at the second time, the processor circuitry is configured to generate a second temperature parameter based on the second generated temperature data at the second time.

4. The electronic device according to claim 1, wherein: in accordance with the determination that the first generated temperature data meets the first temperature criteria at the first time, the processor circuitry is configured to generate the alarm signal.

5. The electronic device according to claim 1, wherein: in accordance with the determination that the second temperature data meets the second temperature criteria at the second time, the processor circuitry is configured to generate the all-clear signal.

6. The electronic device according to claim 1, wherein the processor circuitry is configured to, in accordance with a determination that the second generated temperature data does not meet the second temperature criteria at the second time, transmit, to the one or more second electronic device(s), a fire confirmation signal indicative of a fire and to not transmit the all-clear signal.

7. The electronic device according to claim 1, wherein the electronic device comprises a microphone, and in accordance to the microphone receiving an auditory signal indicative of a fire, the electronic device is configured to transmit, to the one or more second electronic device(s), a fire confirmation signal indicative of a fire.

8. The electronic device according to claim 1, wherein the electronic device is configured to receive an outside alarm signal and/or an outside all-clear signal from at least one of the one or more second electronic device(s) and, in accordance with the electronic device receiving the outside alarm signal but not the outside all-clear signal, the processor circuitry is configured to trigger an alarm indicative of a fire.

9. The electronic device according to claim 8, wherein the alarm is an auditory alarm and/or a visual alarm.

10. The electronic device according to claim 1, wherein the electronic device is a speaker, a personal computer, a laptop, a tablet, a mobile communication device, or a television.

11. The electronic device according to claim 1, wherein the processor circuitry being configured to determine whether the first generated temperature data meets the first temperature criteria at the first time comprises the processor circuitry being configured to determine whether the first generated temperature data is equal to or above a first temperature threshold at the first time.

12. The electronic device according to claim 1, wherein the processor circuitry is configured to transmit the alarm signal and/or the all-clear signal to a server device.

13. A method, performed by an electronic device having a primary function different than detecting a fire, the method comprising:

determining a model of device operating temperatures based on operating temperatures of the electronic device at operating times, and determining a first temperature criteria and/or a second temperature criteria based on the model;

generating temperature data;

determining whether a first generated temperature data meets the first temperature criteria at a first time; and in accordance with the determination that the first generated temperature data meets the first temperature criteria at the first time:

transmitting, to one or more second electronic device(s), an alarm signal;

determining whether a second generated temperature data meets the second temperature criteria at a second time after the first time; and in accordance with the determination that the second generated temperature data meets the second temperature criteria at the second time, transmitting, to the one or more second electronic device(s), an all-clear signal.

14. The method according to claim 13, wherein the method comprises transmitting the alarm signal and/or the all-clear signal to a server device.

* * * * *